US006075882A

United States Patent [19]

Mullins et al.

[11] Patent Number: 6,075,882

[45] Date of Patent: Jun. 13, 2000

[54] SYSTEM AND METHOD FOR OPTICALLY INSPECTING CIGARETTES BY DETECTING THE LENGTHS OF CIGARETTE SECTIONS

[75] Inventors: Michael J. Mullins, Chesterfield; Barry S. Smith, Hopewell, both of Va.; Michael R. Pudas, Eden Prairie, Minn.

[73] Assignee: Philip Morris Incorporated, New York, N.Y.

[21] Appl. No.: 08/877,871

[22] Filed: Jun. 18, 1997

[51] Int. Cl.$^{7}$ .............................. G06K 9/00; A24C 5/32; B07C 5/00

[52] U.S. Cl. .......................... 382/141; 131/280; 131/908; 209/536; 209/939; 250/223 R; 348/125; 356/237.1

[58] Field of Search .................................... 382/143, 141, 382/100, 110; 131/280, 905–908; 209/535–536, 577, 588, 657, 656, 939; 250/223 R, 559.4–559.49; 356/430, 237.1; 364/478.16, 478.17, 478.18; 348/89, 91, 129, 130, 132, 86, 125

[56] References Cited

U.S. PATENT DOCUMENTS

| | | | |
|---|---|---|---|
| 3,089,497 | 5/1963 | Molins et al. | 131/21 |
| 3,588,513 | 6/1971 | Akamatsu et al. | 250/219 |
| 3,818,223 | 6/1974 | Gibson et al. | 250/223 R |
| 3,955,584 | 5/1976 | Molins et al. | 131/96 |
| 4,001,579 | 1/1977 | Lebet et al. | 250/223 R |
| 4,011,950 | 3/1977 | McLoughlin et al. | 209/536 |
| 4,054,377 | 10/1977 | Gibson | 356/430 |
| 4,090,794 | 5/1978 | Benini | 356/445 |
| 4,099,884 | 7/1978 | Nash | 356/430 |
| 4,212,541 | 7/1980 | Ducommun et al. | 356/430 |
| 4,238,994 | 12/1980 | Koch | 493/4 |
| 4,266,674 | 5/1981 | Bell et al. | 209/536 |
| 4,377,743 | 3/1983 | Bolt et al. | 250/223 R |
| 4,398,546 | 8/1983 | Fisher et al. | 131/88 |
| 4,423,742 | 1/1984 | Reuland | 131/84.4 |
| 4,645,921 | 2/1987 | Heitmann et al. | 250/223 R |
| 4,671,663 | 6/1987 | Sick | 356/430 |
| 4,682,038 | 7/1987 | Focke | 250/548 |
| 4,718,026 | 1/1988 | Long et al. | 702/23 |
| 4,756,317 | 7/1988 | Edwards | 131/299 |
| 4,766,315 | 8/1988 | Hellstrom et al. | 250/339.02 |
| 4,767,924 | 8/1988 | Giebel et al. | 250/223 R |
| 4,805,641 | 2/1989 | Radzio et al. | 131/280 |
| 4,841,763 | 6/1989 | Kang et al. | 73/49.3 |
| 4,860,772 | 8/1989 | Hensgen et al. | 131/84.1 |
| 4,865,054 | 9/1989 | Lorenzen et al. | 131/280 |
| 4,875,494 | 10/1989 | Siems | 131/84.1 |
| 4,879,000 | 11/1989 | Gausa | 162/198 |
| 4,906,099 | 3/1990 | Casasent | 356/394 |

(List continued on next page.)

OTHER PUBLICATIONS

"More Feedback: Process Control Leaps Ahead With New ABB Solutions [For Tobacco Manufacturing]", Tobacco Reporter (Nov. 1994) vol. 121, No. 11, p. 26, Doolittle, David E.

*Primary Examiner*—Bhavesh Mehta
*Attorney, Agent, or Firm*—Burns, Doane, Swecker & Mathis, LLP

[57] ABSTRACT

An inspection station irradiates a moving cigarette with a one or more strobed arrays of infrared LEDs. The infrared radiation which passes through the cigarette is received by a video camera, which forms a digital image of the cigarette. A computer then detects the edges of the digital image of the cigarette and determines therefrom the length of the filter, hollow acetate tube, void chamber, tobacco plug, as well as the overall length of the cigarette. The computer then compares these measurements with expected standard values of these sections, and outputs the comparison results to the user using various display formats. According to exemplary aspects, the present invention delivers the cigarettes one at a time to the video camera using a parts handling system. The parts handling system comprises a infeed bin for storing a batch of cigarettes, and for dispensing a cigarette to a carriage positioned beneath the infeed bin. The carriage then transports the cigarette placed thereon between the strobing infrared LED arrays and the video camera, which together provide an image of the cigarette. The carriage then transports the cigarette to an output bin, where a diverter blade knocks the cigarette off the carriage and into the output bin.

28 Claims, 18 Drawing Sheets

U.S. PATENT DOCUMENTS

| | | | |
|---|---|---|---|
| 4,907,607 | 3/1990 | Focke et al. | 131/280 |
| 4,915,827 | 4/1990 | Rosenthal | 209/577 |
| 4,926,886 | 5/1990 | Lorenzen et al. | 131/84.4 |
| 4,941,482 | 7/1990 | Heitmann et al. | 131/84.4 |
| 4,963,743 | 10/1990 | Satake et al. | 250/339.07 |
| 4,976,544 | 12/1990 | Neri | 356/394 |
| 4,986,285 | 1/1991 | Radzio et al. | 131/280 |
| 5,000,323 | 3/1991 | Cahill et al. | 209/536 |
| 5,006,722 | 4/1991 | Adelson | 250/559.47 |
| 5,010,904 | 4/1991 | Lassiter | 131/280 |
| 5,013,905 | 5/1991 | Neri | 250/223 R |
| 5,024,333 | 6/1991 | Brink et al. | 209/535 |
| 5,061,063 | 10/1991 | Casasent | 356/71 |
| 5,086,279 | 2/1992 | Wochnowski et al. | 324/637 |
| 5,118,195 | 6/1992 | Dobbie | 356/430 |
| 5,166,748 | 11/1992 | Dahlquist | 356/346 |
| 5,189,708 | 2/1993 | Cox et al. | 382/143 |
| 5,208,870 | 5/1993 | Ennis | 382/143 |
| 5,214,969 | 6/1993 | Adkins et al. | 131/908 |
| 5,223,915 | 6/1993 | Neri | 356/394 |
| 5,228,462 | 7/1993 | Osmalov et al. | 131/280 |
| 5,235,649 | 8/1993 | Reda | 382/143 |
| 5,237,621 | 8/1993 | Cox et al. | 382/143 |
| 5,243,408 | 9/1993 | Whitman, III | 356/430 |
| 5,305,392 | 4/1994 | Longest, Jr. et al. | 382/112 |
| 5,341,824 | 8/1994 | Fletcher et al. | 131/281 |
| 5,345,955 | 9/1994 | Clearman et al. | 131/359 |
| 5,353,357 | 10/1994 | Longest, Jr. et al. | 382/141 |
| 5,365,596 | 11/1994 | Dante et al. | 382/141 |
| 5,366,096 | 11/1994 | Miller | 209/535 |
| 5,404,023 | 4/1995 | Nen et al. | 209/536 |
| 5,406,376 | 4/1995 | Maiwaid et al. | 356/237.1 |
| 5,410,396 | 4/1995 | Rochester | 356/73.1 |
| 5,414,270 | 5/1995 | Henderson et al. | 250/559.46 |
| 5,426,509 | 6/1995 | Peplinski | 356/430 |
| 5,432,600 | 7/1995 | Grollimund et al. | 356/237.2 |
| 5,448,365 | 9/1995 | Grollimund et al. | 356/430 |
| 5,505,215 | 4/1996 | Bencivenni et al. | 131/905 |
| 5,534,114 | 7/1996 | Cutright et al. | 162/139 |
| 5,659,624 | 8/1997 | Fazzari et al. | 382/110 |
| 5,692,621 | 12/1997 | Davis et al. | 209/587 |
| 5,695,070 | 12/1997 | Draghetti | 131/908 |
| 5,715,843 | 2/1998 | Hapke et al. | 209/536 |
| 5,791,497 | 8/1998 | Campbell et al. | 209/577 |
| 5,808,305 | 9/1998 | Leidecker et al. | 209/577 |

TEST DATA DETAILS

| 708 LATEST TEST DATA (IN PIXELS) | | 706 LATEST TEST DATA (IN mm) | 704 ACTUAL PART (IN mm) |
|---|---|---|---|
| HOLLOW = | 254.8 | = 28.9 | = 30.0 |
| HAT = | 51.0 | = 5.9 | = 7.0 |
| VOID = | 69.7 | = 9.3 | = 7.0 |
| TOB = | 143.3 | = 16.9 | = 18.0 |
| OAL = | 518.8 | = 60.7 | = 62.0 |

SYSTEM AND METHOD FOR OPTICALLY INSPECTING CIGARETTES BY DETECTING THE LENGTHS OF CIGARETTE SECTIONS

BACKGROUND

The present invention relates generally to a system and method for inspecting cigarettes, and more particularly, to a system and method for detecting the length of various sections within cigarettes.

To ensure a high quality product, some cigarette manufacturers optically inspect the cigarettes at various stages of production using a video camera. The images obtained from the video camera may then be fed to a digital computer and analyzed for the presence of various imperfections (i.e., departures from expected specifications). U.S. Pat. Nos. 5,235,649, 5,366,096, 5,414,270, 5,013,905 and 4,976,544 exemplify this technique. For instance, U.S. Pat. No. 5,235,649 forms a digital image of the end of a tobacco plug of a cigarette. This technique then determines the standard deviation of the pixel values within the image. The standard deviation is used to quantify how firmly the tobacco is packed within the cigarette. Other techniques image the surface of the cigarette paper and detect pinholes or blemishes on the cigarette paper through image analysis.

The above described techniques provide useful information regarding the external surface of the cigarette, but fail to detect internal imperfections. For instance, with reference to FIG. 1*a*, the cigarette 2 discussed in commonly assigned U.S. Pat. No. 5,388,594 comprises a tobacco plug 4, a hollow void chamber 6, a hollow acetate tube 8 and a mouthpiece filter element 10, all surrounded by various layers of cigarette paper 9. The paper 9 conceals the underlying cigarette sections. As such, defects in the length of these various sections can not readily be ascertained by an inspection of the exterior of the cigarette.

To overcome this drawback, some manufacturers take random samples of cigarettes at various stages of their production and dissect the cigarettes. A technician then measures the dimensions and spacings of the internal sections. However, cutting into the cigarettes often disturbs the spacing of the sections, and thereby obscures the boundary between different sections. Moreover, often different technicians employ different measuring techniques, sometimes producing conflicting measurements for the same cigarette.

Some practitioners in the art have proposed the use of optical systems for detecting the internal properties of cigarettes. Typically, these techniques entail directing a beam of electromagnetic radiation through the cigarette at one or more localized points on the cigarette. A photodetector receives the electromagnetic radiation which passes through the cigarette. The output of the photodetector, in turn, may be processed to reveal a characteristic of the cigarette. For instance, U.S. Pat. No. 5,010,904 proposes transmitting infrared radiation through the tip of a cigarette tobacco plug. A separate detector element receives the infrared radiation after it passes through the tip. The output of the detector is then fed to a comparator which compares the output of the detector with a threshold value. A measured value below the threshold value reflects a loosely packed tobacco plug. U.S. Pat. Nos. 4,001,579, 4,986,285, and 4,212,541 propose similar techniques.

Because of the relative simplicity of the above described techniques, they fail to provide reliable information regarding the boundaries between adjacent cigarette sections, especially where those boundaries are somewhat ambiguous. More specifically, by narrowing the focus of the investigation to a limited point on the cigarette, these techniques fail to provide an indication of various imperfections which can only be detected by examining the cigarette as a whole (e.g., by taking into account the spatial relationships between different sections of the entire cigarette).

Accordingly, it is an exemplary objective of the present invention to provide a system and method for accurately inspecting the internal sections of a cigarette which accurately reflects the dimensions of the internal sections of cigarettes. It is a more specific exemplary objective of the present invention to provide a system and method for efficiently and reliably providing the measurements M1, M2, M3, M4, and M5 shown in FIG. 1*b*, corresponding, respectively, to the length of the filter element 10, the length of the hollow acetate tube 8, the length of the void 6, the length of the tobacco plug 4, and the overall length of the cigarette 2. It is a further objective of the present invention to alert the user when any of these measurements differ from their expected values by more than a prescribed amount.

SUMMARY

These and other exemplary objectives are achieved according to the present invention through an inspection station which irradiates a moving cigarette with one or more strobed arrays of infrared LEDs. The infrared radiation which passes through the cigarette is received by a video camera, which forms a digital image of the cigarette. A computer then detects the edges of the digital image of the cigarette, and determines therefrom the length of the filter, hollow acetate tube, the void chamber, the tobacco plug, as well as the overall length of the cigarette. The computer then compares these measurements with the expected values for these sections, and outputs the comparison results to the user using various display formats. For instance, a cigarette section having a length below the standard length can be indicated by superimposing a red line segment on an image of the substandard cigarette.

According to exemplary aspects, the present invention delivers the cigarettes one at a time to the video camera using a parts handling system. The parts handling system comprises an infeed bin for storing a batch of cigarettes, and for dispensing a cigarette onto a carriage when said carriage is positioned beneath the infeed bin. The carriage then transports the cigarette placed thereon between the strobing infrared LED arrays and the video camera, which together provide an image of the cigarette. The carriage then transports the cigarette to an output bin, where a diverter blade knocks the cigarette off the carriage into the output bin.

In this manner, the present invention allows the user to investigate the internal structure of cigarettes without cutting into the cigarettes. Such a process can be performed on random samples over a span of time to periodically assess the quality of the cigarettes.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth in order to provide a thorough understanding of the invention. However it will be apparent to one skilled in the art that the present invention can be practiced in other embodiments that depart from these specific details. In other instances, detailed descriptions of well-known methods, devices, and circuits are omitted so as not to obscure the description of the present invention with unnecessary detail. In the Figures, like reference numbers designate like parts.

Figure 1A:
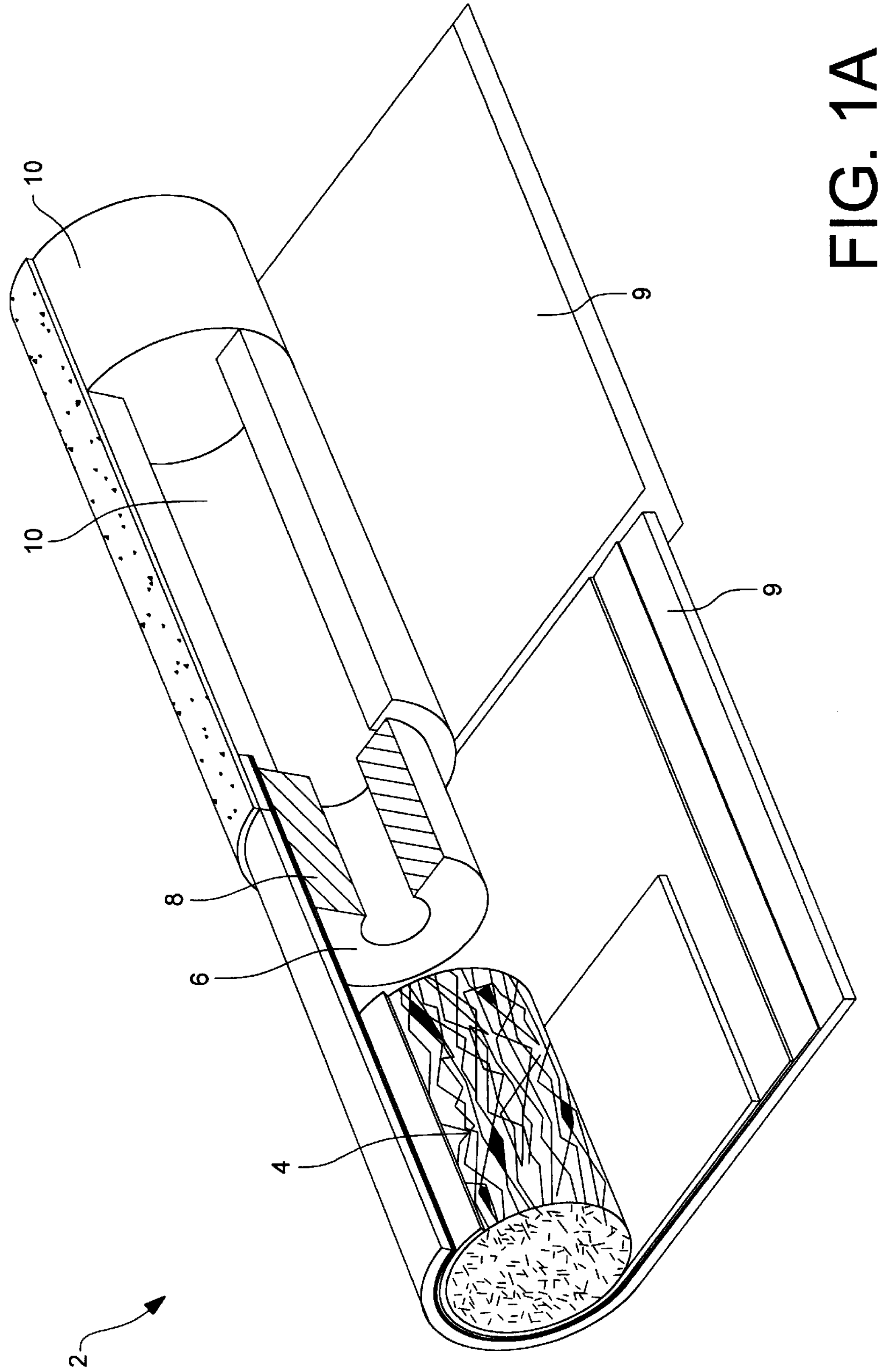
FIG. 1*a* shows an exemplary three-dimensional construction of a cigarette including a void and a hollow acetate tube.
Figure 1B:
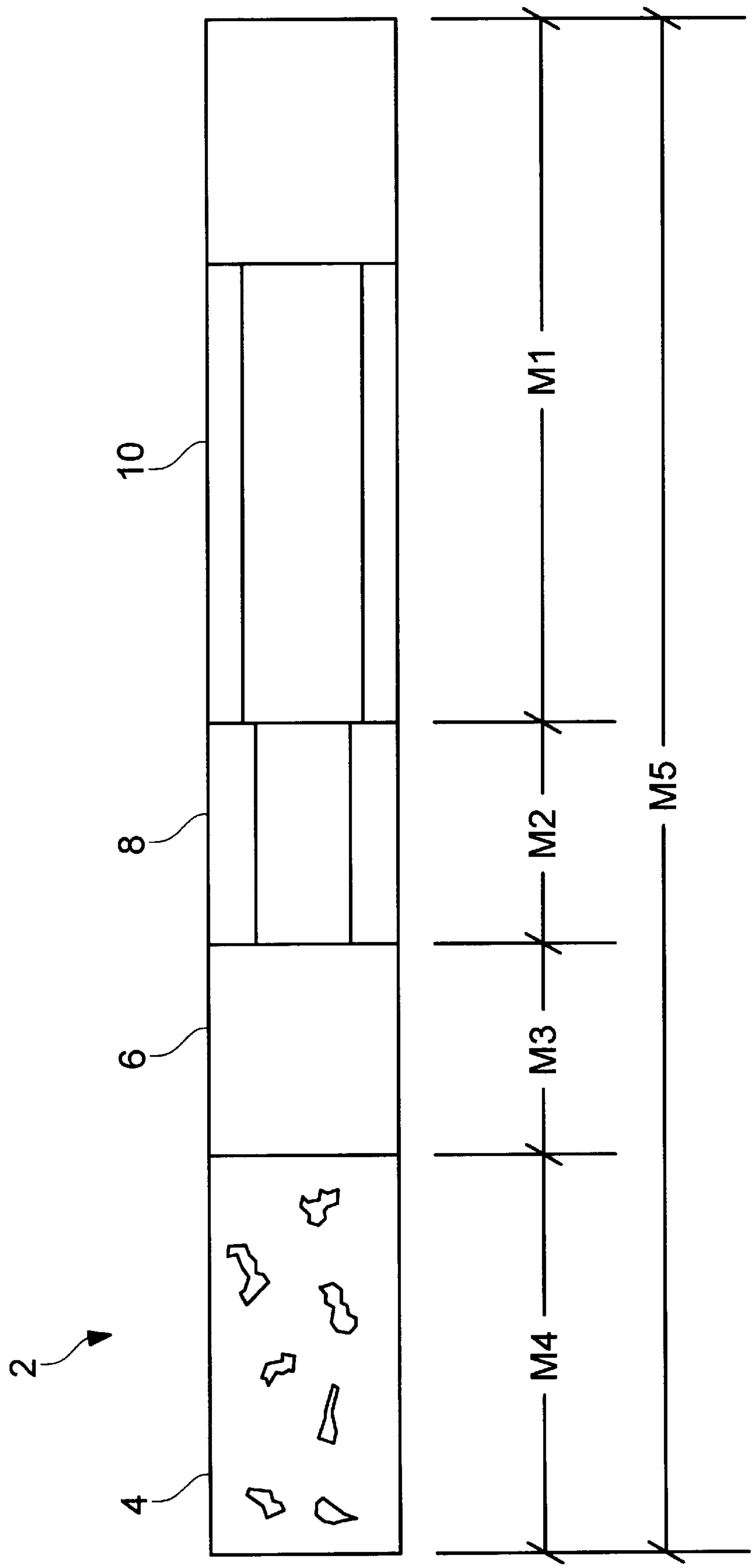
FIG. 1*b* is a two-dimensional depiction of the cigarette of FIG. 1*a;*

At the outset, it is pointed out that, for the sake of brevity, the analysis performed by the present invention is discussed in the context of the specific cigarette design shown in FIGS. 1*a* and 1*b*. Yet the principles disclosed herein are applicable to any type of cigarette, or indeed, any elongate or rod-like smoking object having internal sections.

Figure 2:
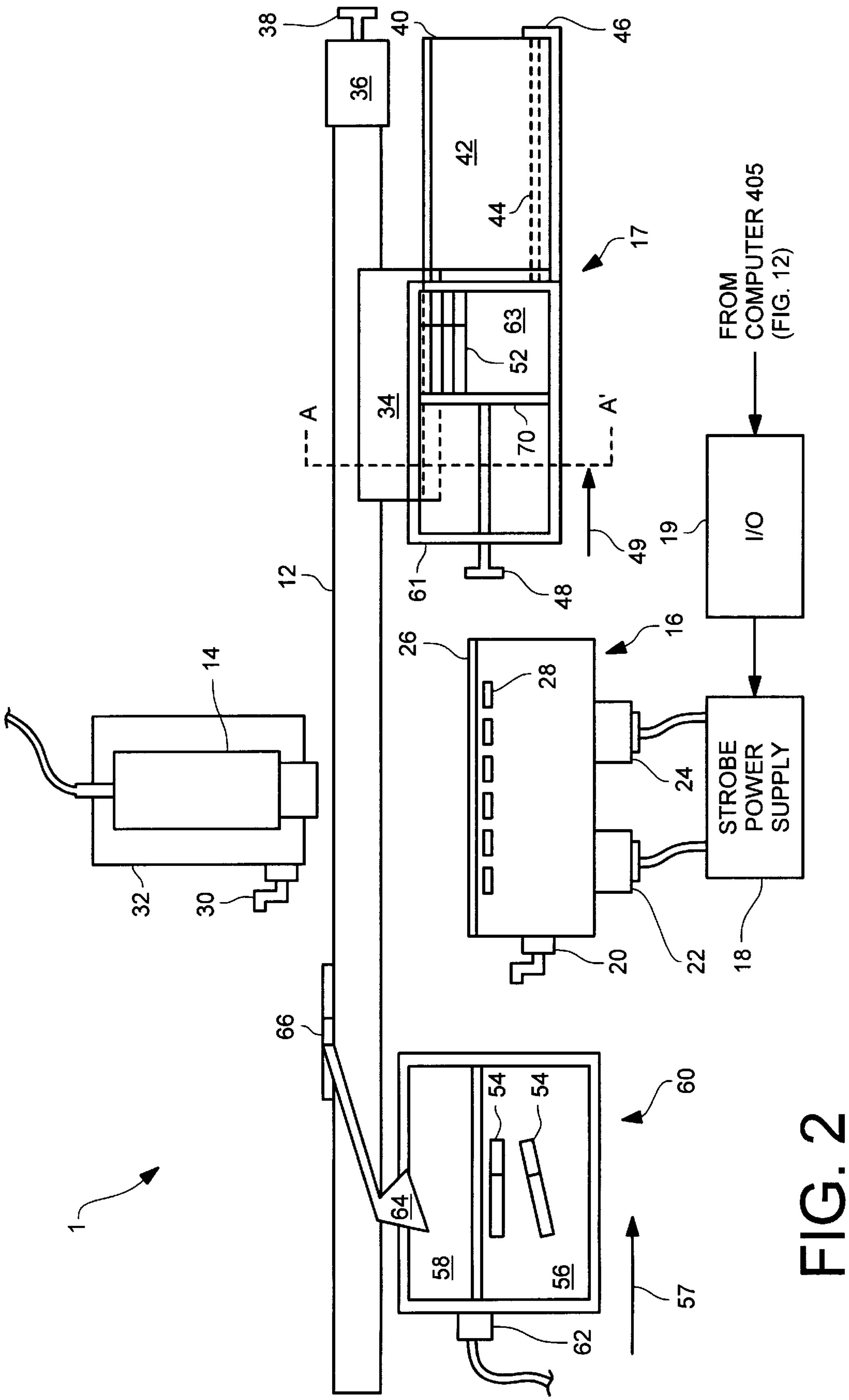
FIG. 2 shows an exemplary overhead layout of the cigarette inspection system of the present invention, where the carriage is positioned beneath the infeed bin.
Figure 3:
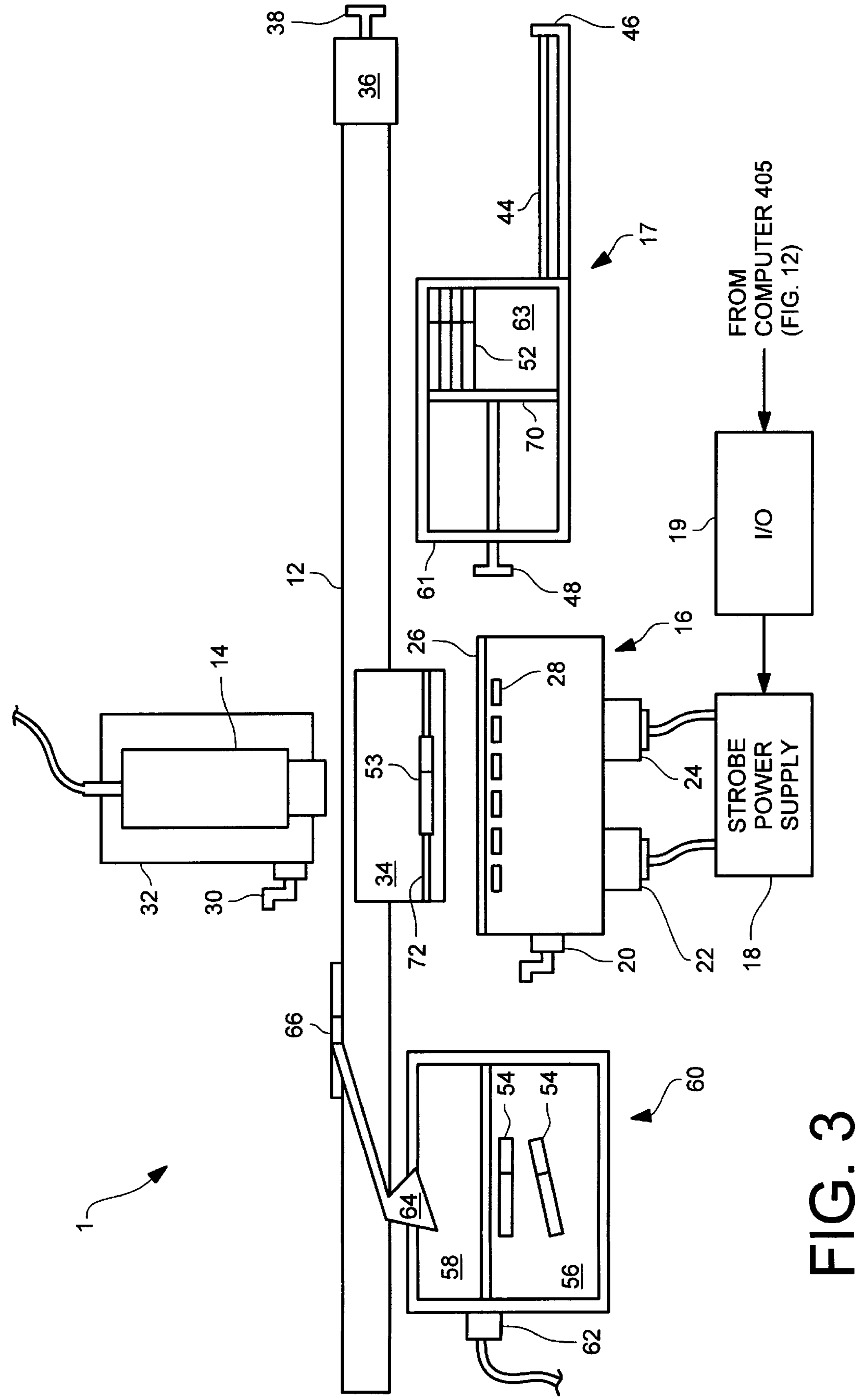
FIG. 3 shows an exemplary overhead layout of the cigarette inspection system of the present invention, where the carriage is positioned between the video camera and the strobing LED source.
Figure 4:
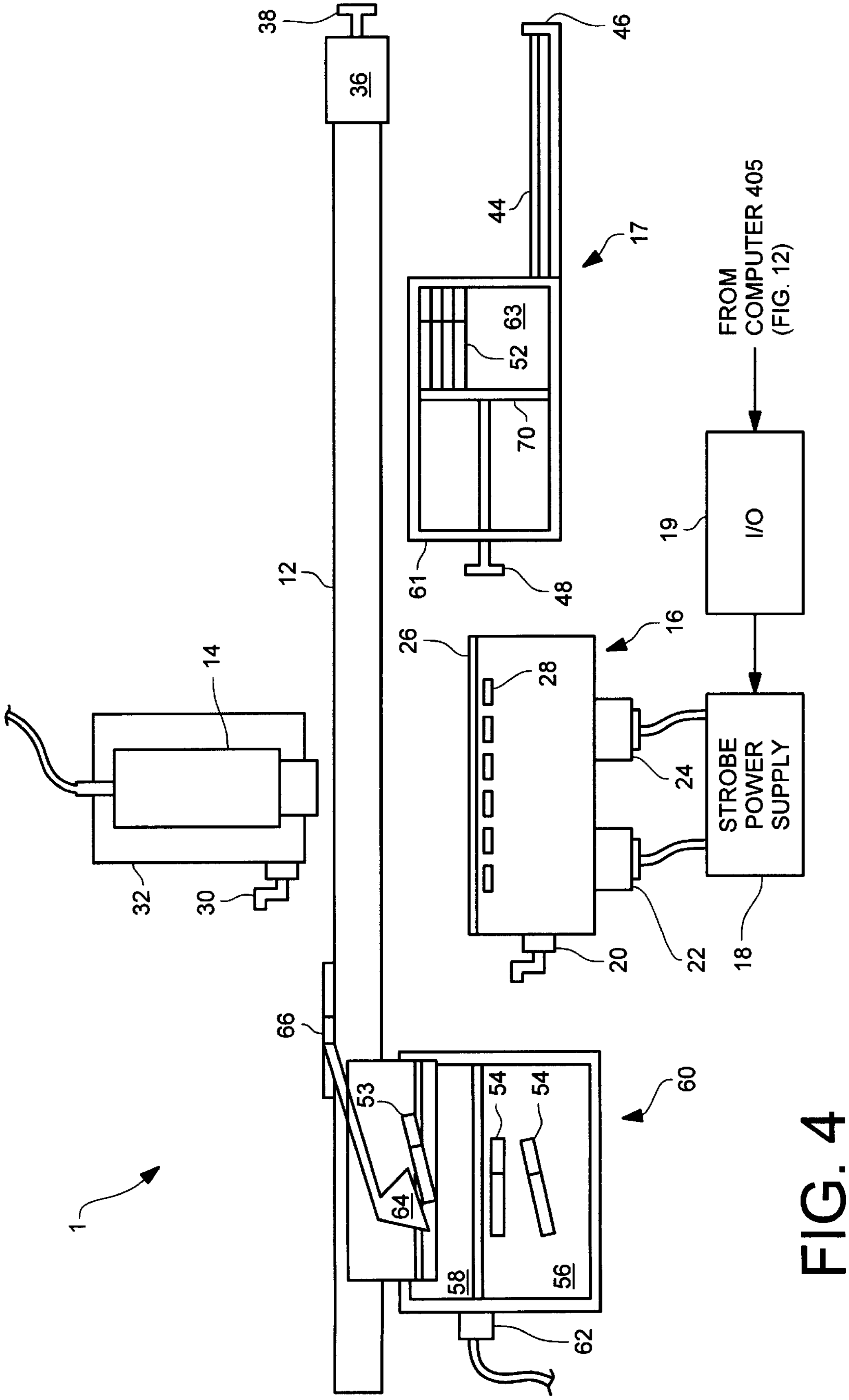
FIG. 4 shows an exemplary overhead layout of the cigarette inspection system of the present invention, where the carriage is positioned over the output bin.

FIGS. 2–4 illustrate an overview of the parts handling system 1 of the present invention, with the carriage 34 located beneath a infeed bin 61 (in FIG. 2), between a video camera 32 and an infrared source 16 (in FIG. 3), and over an output bin 60 (in FIG. 3).

More specifically, with reference to FIG. 2, the system comprises a carriage 34 which rides a rail 12. A stepper motor 36, in conjunction with a revolution counter 38 and a motor controller (not shown), moves the carriage 34 up and down the rail 12, beneath an infeed assembly 17 and an output bin 60. In exemplary embodiments, the carriage 34 traverses about two feet between the infeed assembly 17 and the output bin 60. The motor controller is in communication with a computer (not shown in FIG. 2), which monitors the position of the carriage 34 on the rail 12.

The infeed assembly 17 includes an infeed bin 61 including a dispensing compartment 63 for storing one or more cigarettes 52. The length of the dispensing compartment 63 can be varied by moving the partition plate 70 to accommodate finished cigarettes having differing lengths, or to accommodate longer unfinished cigarette rods containing plural filter elements and tobacco plugs (taken from an intermediate stage of cigarette production). The partition plate 70 is moved by moving the plunger 48 forward or backward.

As will be described more fully in later figures, the infeed bin 61 includes a delivery slot on the bottom of the bin 61, along the edge of the bin 61 closest to the rail 12. An inhibitor bracket 42 is positioned beneath the bin 61, such that one lip 40 thereof blocks the delivery slot, thereby preventing cigarettes from escaping. When the carriage 34 is moved beneath the infeed bin 61, it displaces the inhibitor bracket 42 from its position underneath the infeed bin 61. More specifically, an edge of the carriage 34 contacts an edge of the inhibitor bracket 42, and forces the inhibitor bracket 42 to the right (as shown in FIG. 2). The inhibitor bracket 42 is mounted on three rods (one of which is shown as rod 44), mounted on a frame 46. One of the rods passes through a spring, which applies resistive force to the left, against the carriage 34. As such, when the carriage 34 moves out from under the infeed bin 61, the springs force the inhibitor bracket 42 back to its original position underneath the infeed bin 61.

While underneath the infeed bin 61, the carriage 34 grabs one cigarette from the delivery slot of the infeed bin 61. As best shown in FIG. 3, the carriage 34 includes a recessed strip 72 running the length of the carriage 34. The recess has a curvature which generally matches the curvature of a cigarette 53 captured from the infeed bin 61. Furthermore, the strip 72 includes a plurality of conduits, connected to a vacuum source, which hold the cigarette firmly in place on the strip 72 as the carriage traverses the rail 12. The computer (not shown in FIG. 3) turns on the vacuum force when the carriage 34 is located beneath the infeed bin 61, and turns off the vacuum when the carriage 34 is located over the output bin 60.

Having captured a cigarette 53 from the infeed bin 61, the carriage proceeds to the left, where it passes between infrared source 16 and video camera 14 (with reference to FIG. 3). While positioned therebetween, the infrared source 16 is activated, which directs a beam of infrared radiation through the cigarette 53. The camera captures the infrared radiation emitted by the infrared source, as well as the radiation which passes through the cigarette 53. In this manner, the camera forms an image representative of the internal sections of the cigarette 53.

Figure 9:
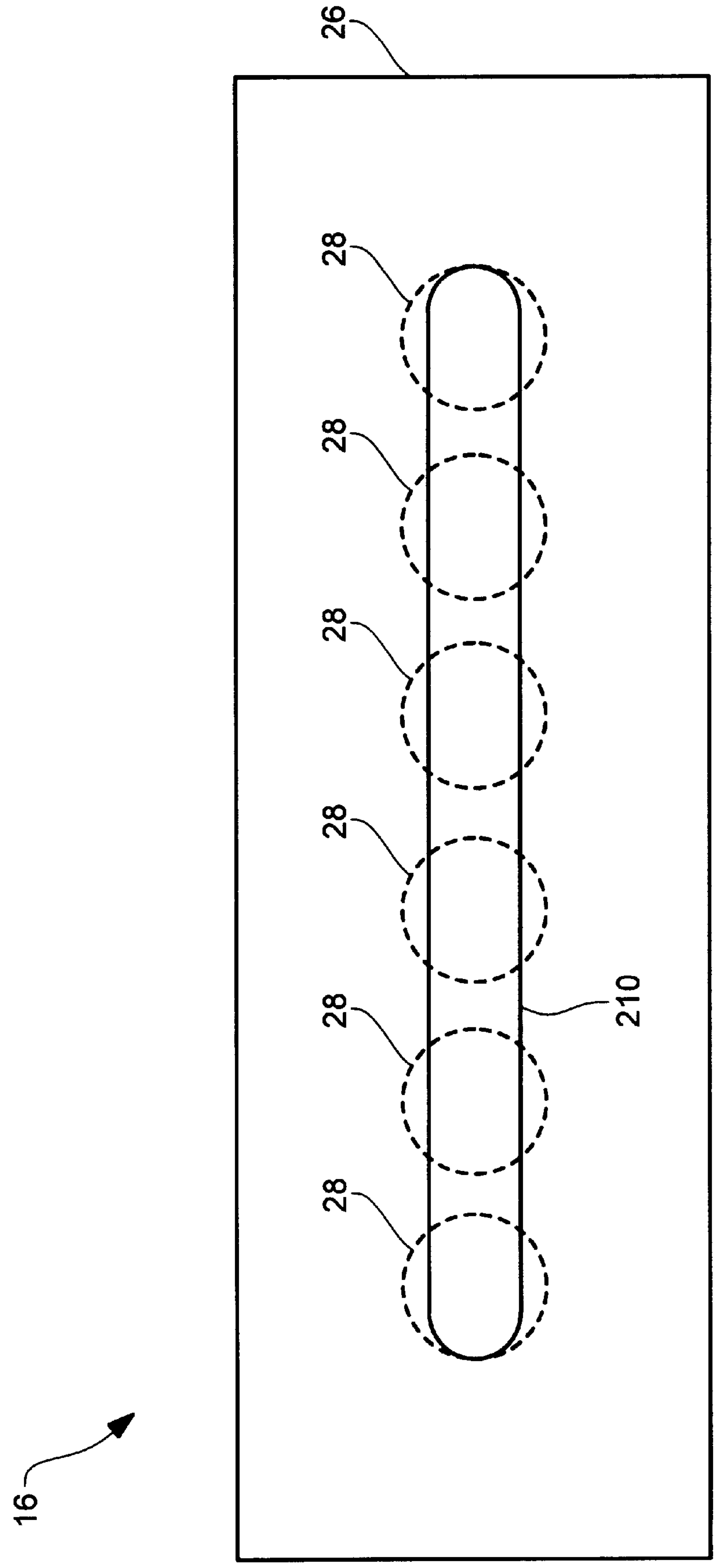
FIG. 9 shows an exemplary face plate of the strobing LED source, and the LED arrays positioned behind the face plate.

The infrared source 16 is located on a frame support (not shown) about 10 inches above a table top surface. The frame can include an adjustment mechanism (not shown) which alters the height of the infrared source 16 by rotating handle 20. The infrared source 16 itself includes a plurality (e.g., six) of infrared LED arrays (one of which is denoted as array 28). With reference to FIG. 9, the arrays 28 are solid state components (e.g., 10×10) made from etched LEDs in wafer form, emitting infrared radiation of about 980 nm. A face plate 26 includes an elongate aperture 210 which restricts the beam of infrared radiation produced by the arrays 28 to form an elongate beam.

Returning to FIG. 3, the infrared source 16 is connected to a strobe power supply 18 through cable connection ports 22 and 24. The strobe power supply, in turn, is connected to I/O unit 19, which is controlled by a separate computer 405 (not shown in FIG. 3). According to one exemplary embodiment, the strobe power supply 18 supplies about 80–100 amps for about 500 $\mu$secs to the arrays 28 of the infrared source 16 when activated by the computer 405 via the I/O unit 19.

The camera 14 is positioned on a frame support member 32, generally at the same height as the infrared source 16. The frame support member 32 can include an adjustment mechanism (not shown) for changing the height of the camera 14 using handle 30. The camera 16 itself is conventional, per se. However, to further enhance the camera's receptivity to infrared radiation, the infrared filter commonly contained within conventional cameras is removed.

After passing in front of the camera 14, the carriage 34 moves further down the rail 12 to the output bin 60, as best illustrated with reference to FIG. 4. At the output bin 60, the cigarette 53 is dislodged from the carriage 43 using a deflecting blade 64, which is secured to the rail 12 by frame 66. The frame 66 positions the deflector blade 64 so that the blade 64 clears the carriage 34 as the carriage passes beneath the blade 64. Yet the blade 64 is close enough to the top of the carriage 34 so that it contacts and displaces the cigarette 53 located on the top of the carriage 34. Furthermore, the blade 64 is angled in such a manner to deflect the cigarette toward one side of the rail 12, immediately above the output bin 60. To further facilitate dislodging the cigarette, the computer (not shown in FIG. 4) turns off the vacuum just before the cigarette 53 contacts the deflection blade 64.

Figure 10:
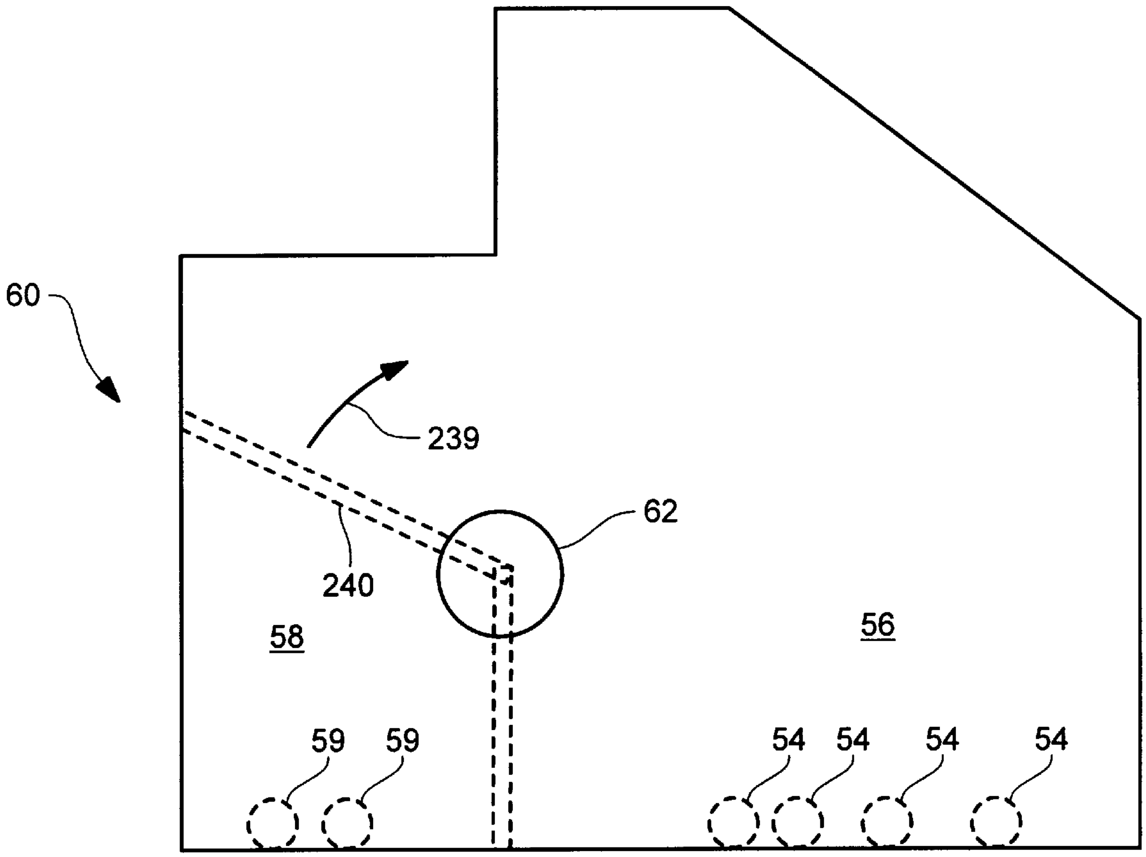
FIG. 10 shows an exemplary view of the output bin.

The output bin itself includes two compartments. The larger of the two compartments 56 stores within specification cigarettes 54, while a smaller compartment 58 stores out-of-specification cigarettes, as assessed by the computer. FIG. 10 illustrates a side view of output bin 60. As shown there, a diverter paddle 240 pivots in the direction 239 to deflect the cigarettes which fall from the carriage into either compartment 58 or compartment 56, depending on the position of the diverter paddle 240. The deflector paddle 240 will deflect falling cigarettes into compartment 56 when the paddle 240 is positioned as shown in FIG. 10.

A rotary air cylinder 62 flips the paddle 240 to divert the cigarettes into either compartment 58 or 56, as commanded by the computer. For example, if the computer determines that the cigarette 53 imaged in FIG. 3 was out-of-specification, the computer instructs the air cylinder 62 to flip the paddle 240 from its current position (shown in FIG. 10), to a new position, as indicated by the arrow 239, thereby deflecting the falling cigarette into the compartment 58. The compartment 58 is smaller than the compartment 56, as one would expect there to be more within-specification cigarettes (e.g., cigarettes 54) than out-of-specification cigarettes (e.g., cigarettes 59). Although not shown in FIG. 10, the output bin 60 could include a drawer located in the bottom of the bin 60, to facilitate removal of the accumulated cigarettes.

Figure 5:
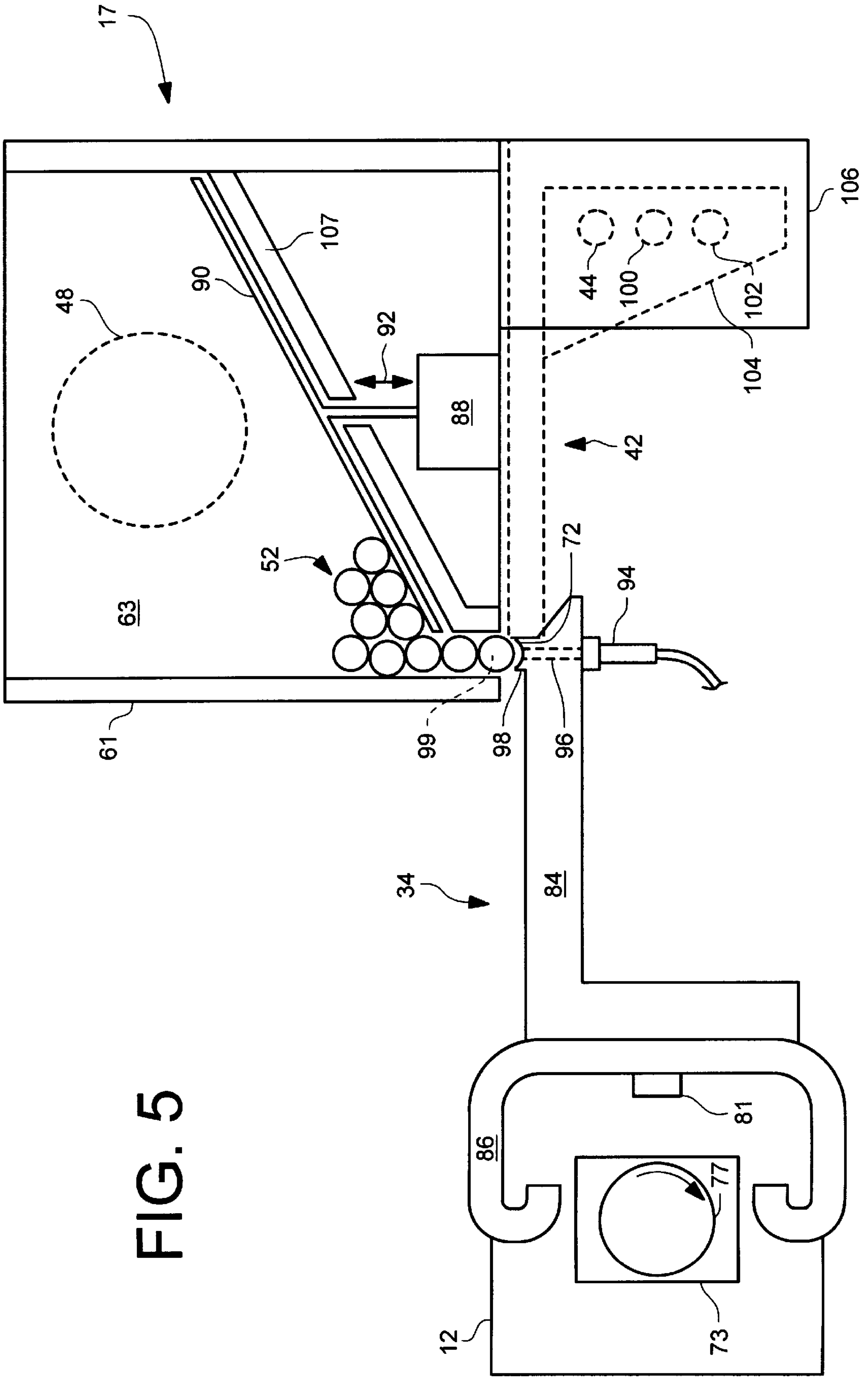
FIG. 5 shows an exemplary view of the infeed bin, with the carriage positioned beneath the infeed bin.

Having presented an overview of the parts handling system, the infeed assembly 17 and carriage 34 will be described in more detail with reference to FIGS. 5–8. FIG. 5, for instance, shows a cross section of the infeed assembly 17 corresponding to the line A-A' shown in FIG. 2, looking at the cross section in the direction denoted by arrow 49. As shown in FIG. 5, the dispensing compartment includes a sloped bottom wall 107 over which the cigarettes 52 slide down and come to rest over a delivery slot 99. To promote the movement of the cigarettes toward the delivery slot 99, the bin 61 includes a motor 88 beneath the bottom wall 107 for agitating a plate 90 inside the bin 61 in a vibratory up-down motion 92. The motor can be continually activated, or preferably activated only when the carriage passes beneath the infeed bin 61 to capture a cigarette from the dispensing compartment 63. The computer (not shown in FIG. 5) controls when the motor is turned on and off, depending on the position of the carriage 34 on the rail 12.

Figure 6:
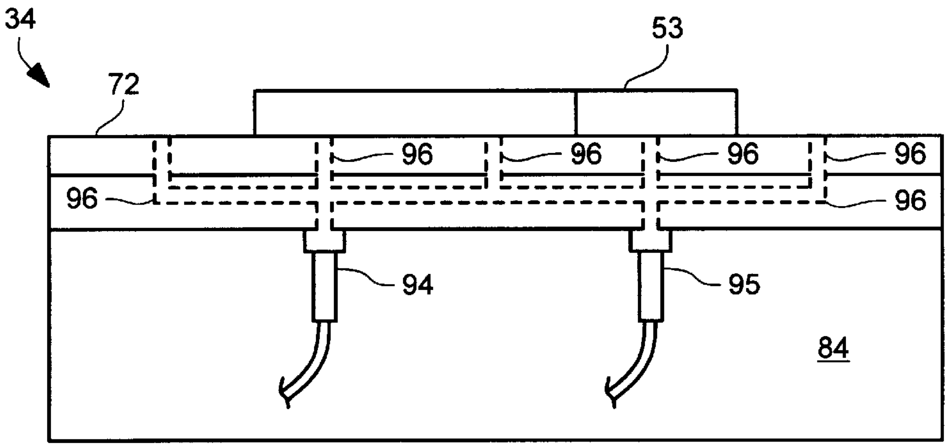
FIG. 6 shows another exemplary view of the carriage.

The carriage 34 itself comprises a generally L-shaped member 84. The member 84 includes, at the end thereof, a raised portion 98 including a curved depression 72 for receiving the cigarette. As shown in FIG. 5 and FIG. 6, the member 84 includes a network of conduits 96 beginning at the depression 72 and terminating in vacuum nozzles 94 and 95. The conduits 96 draw air from the surface of the depression 72 and channel the air out through vacuum nozzles 94 and 95, thereby creating a vacuum force which holds the cigarette (e.g., cigarette 53) firmly on the depression 72. Although not shown in FIGS. 5 and 6, for smaller cigarette rods, one of the vacuum nozzles (e.g., 94 or 96) can be closed off by a valve attached to the vacuum nozzles (or their associated vacuum feed lines).

Returning to FIG. 5, the L-shaped member 84 is secured to a C-shaped bracket 86, which in turn, is slidably secured to rail 12. The carriage 34 is secured to a band 81 which runs the complete length of the rail 12. The band 81 wraps around the end of rail 12 and passes into the interior of the rail 12, where it is connected to a slider member 73. The slider member 73 is threaded on a screw rod 77 which runs the length of the rail 12. The motor 36 (FIG. 2) rotates the screw rod 77, which advances the slider member 73 threaded thereon, and in turn, the band 81. The carriage 34 moves with the band 81.

FIG. 5 generally corresponds to FIG. 2, where the carriage 34 is positioned beneath the infeed bin 61 for capturing a cigarette from the dispensing compartment 63 through the delivery slot 99. As such, the inhibitor bracket 42 is shown with dotted lines to indicate that it has been displaced from its position beneath the infeed bin 61 by the carriage 34.

Figure 7:
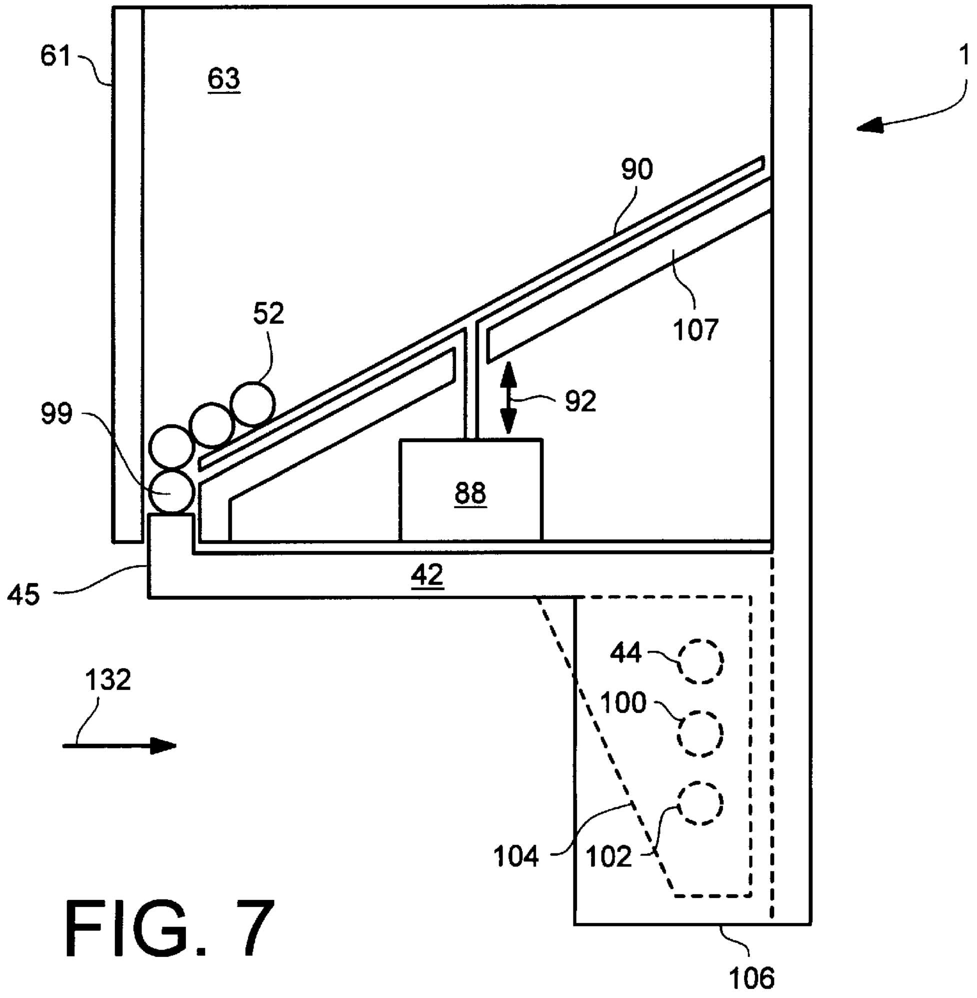
FIG. 7 shows another exemplary view of the infeed bin.

FIG. 7 illustrates a side view of the infeed assembly 14 when the carriage 34 moves downstream, and the inhibitor bracket 42 advances to a position beneath the infeed bin 61 (corresponding generally to FIGS. 3 and 4). As shown in FIG. 7, the inhibitor bracket 42 includes a lip portion 45 which blocks the delivery slot 99.

Figure 8:
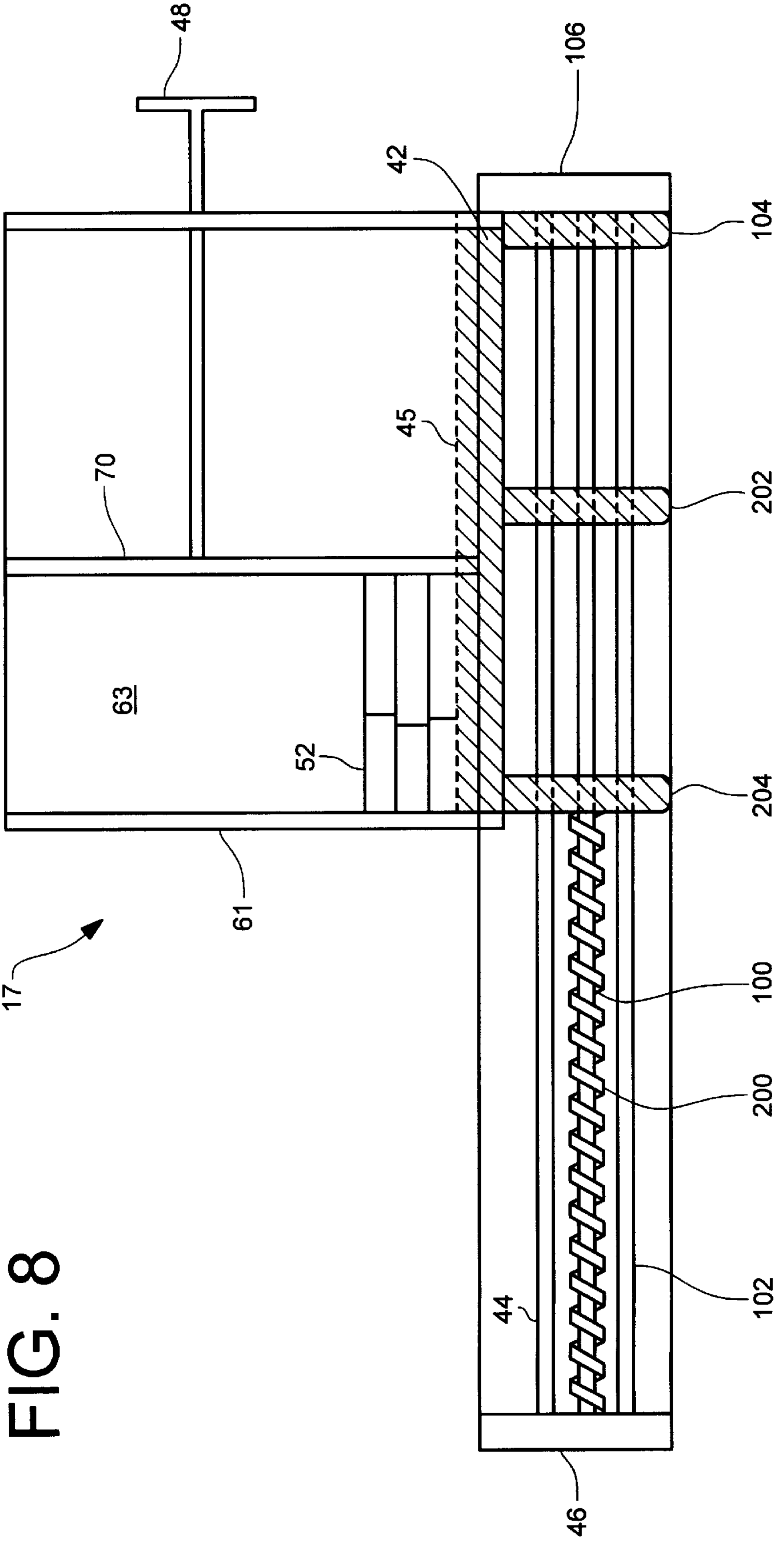
FIG. 8 shows still another exemplary view of the infeed bin, illustrating the mounting of the inhibitor bracket beneath the infeed bin.

The inhibitor bracket 42 rides on rails 44, 100, and 102, the ends of which are shown in FIG. 7. FIG. 8 provides a better illustration of the rails 44, 100, and 102. As shown there, the rails extend between two end pieces, 46 and 106 respectively. The inhibitor bracket 42 is connected to the rods via bearing sleeves 204, 202, and 104. The middle rod 100 passes through a spring 200. When the carriage 34 (not shown in FIG. 8) forces the inhibitor bracket 42 toward the end piece 46, the spring 200 is compressed, creating a force directed against the carriage 34. As such, when the carriage 34 moves from beneath the infeed bin 61, the spring 200 pushes the inhibitor bracket 42 back to its position beneath the infeed bin 61.

Figure 11:
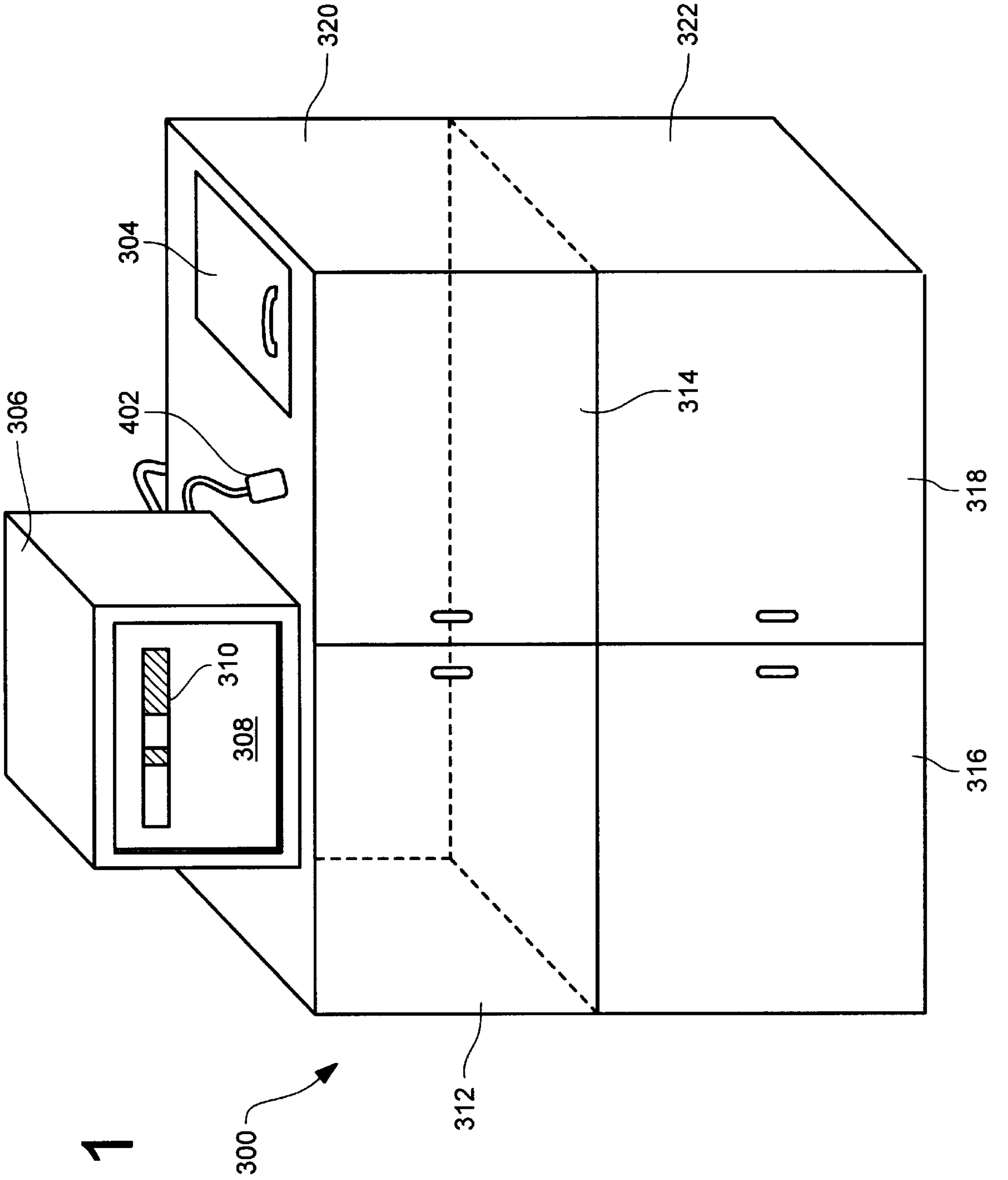
FIG. 11 shows an exemplary view of the cart which houses the parts handling system, and supporting electrical components.

As illustrated in FIG. 11, the parts handling assembly 1 discussed above is preferably located in a compartment 320 of a moveable cart 300. The user gains access to the parts handling system 1 through cabinet plexi-glass doors 312 and 314, which are preferably tinted to reduce the amount of ambient light reaching the camera 14. Furthermore, the user can load a batch of cigarettes through top door 304.

The bottom compartment 322 holds the computer processing components of the present invention, and can be accessed through cabinet doors 316 and 318. The computer processing components interface with the parts handling system 1 located in compartment 320, as well as the display monitor 306 located on the top of the cart 300, and the mouse device 402. As will be described in detail in the ensuing discussion, the computer processor components provide a display of an image of a cigarette 310 on a monitor display 308, corresponding to the images captured by the camera 14. It should be quite evident that the above configuration is entirely exemplary; those having skill in the art will recognize that many other configurations are possible.

Figure 12:
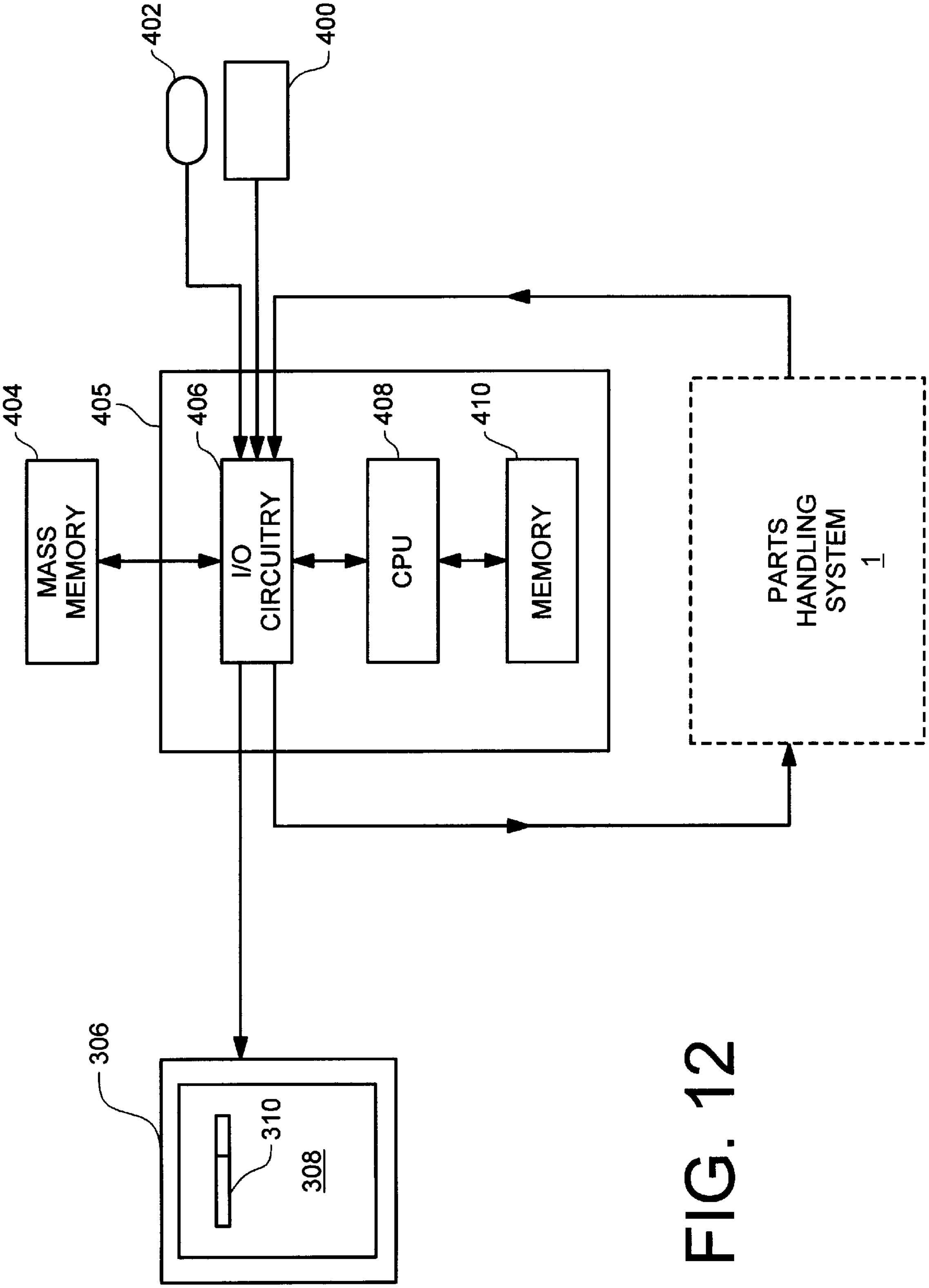
FIG. 12 shows an exemplary electrical configuration of the present invention.

The above referenced computer processing components are illustrated in more detail in FIG. 12. As shown there, the present invention employs a computer 405 including a CPU 408, internal memory 410, and I/O circuitry 406. The I/O circuitry 406 receives input from a "mouse" device 402, and/or a keyboard 400, and provides output to a display monitor 306. Furthermore, the I/O circuitry 406 receives information from the parts handling system 1, and transmits various commands to the parts handling system 1. For example, the computer receives an indication of the position of the carriage 34 on the rail 12 (as a function of the output of the revolution counter 38 of FIG. 2, for instance), and receives input from the camera 14. The camera outputs commands turning the agitator motor 88 (of FIG. 5) on and off, turning the infrared source 16 on and off, and flipping the deflection paddle 240 (of FIG. 10) back and forth. In this sense, the computer 405 serves as the master coordinator of the various functions performed by the parts handling system 1.

Figure 13:
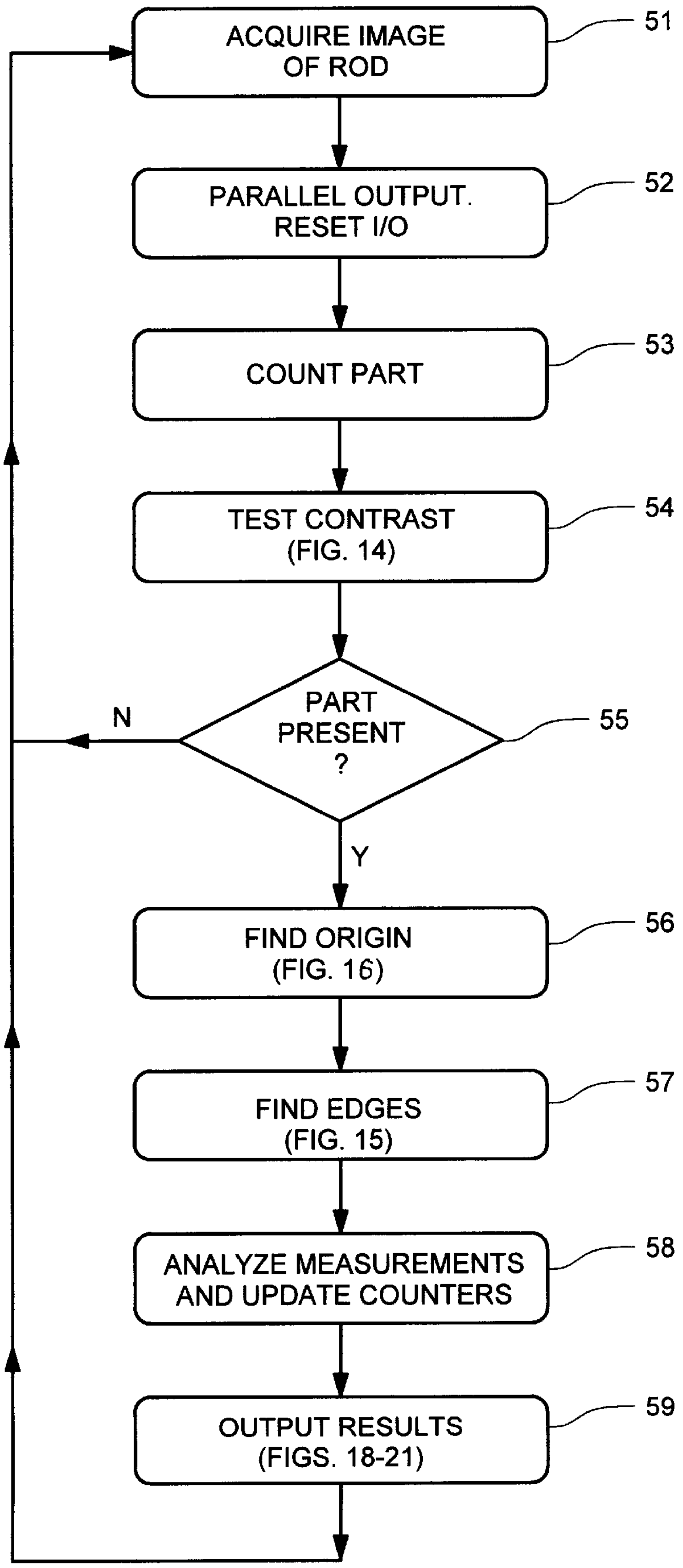
FIG. 13 shows an exemplary algorithm for analyzing the images captured by the camera.

Having described the various exemplary components of the present invention, attention will now be directed to the image analysis performed by the computer 405, as summarized in FIGS. 13–21. FIG. 13 illustrates the principal steps of the image analysis. As shown there, the process begins by transferring the image of the cigarette captured by the camera 14 to the computer 405 via the I/O circuitry 406 (steps S1 and S2). Following image capture, a counter is incremented (step S3). The counter indicates the number of times which the camera has fed an image to the computer 405. This number should correspond to the number of cigarettes inspected by the system. However, if the carriage 34 fails to capture a cigarette from the infeed bin 61, then one or more images sent to the computer will not include an image of a cigarette, and the number of cigarettes inspected will not correspond to the counter total determined in step S3.

To determine whether the data captured by the camera 14 includes an image of a cigarette, the algorithm shown in FIG. 13 preforms a contrast test (step S4). If the contrast test indicates that a cigarette is missing (as determined in step S5), then the algorithm returns to step S1, where another cigarette is captured and analyzed in a subsequent measurement cycle. If the algorithm determines that a cigarette is present, then the algorithm advances to step S6, where the computer determines at least one boundary which separates the cigarette image from the background image. This boundary provides a frame of reference (e.g., a reference origin) from which the internal boundaries corresponding to different internal sections of the cigarette can be ascertained in step S7.

Step S7 specifically comprises a step of determining the dimensions M1 through M5 of the model cigarette illustrated in FIG. 1*b*, which correspond, respectively, to the length of the filter element 10, the length of the hollow acetate tube 8, the length of the void 6, the length of the tobacco plug 4, and the overall length of the cigarette 2. These length measurements are first determined as a function of the number of pixels spanning the lengths of M1 through M5.

In step S8, the measurements Ml through MS are converted from number of pixels to proper scientific units (such as millimeters or inches) using a conversion factor relating the pixel data to the scientific units. Thereafter, the length measurements are compared with prestored expected values for M1 through M5. If the measured values of M1 through M5 vary substantially from the expected values of M1 through M5, the cigarette is out-of-specification. The number of out-of-specification cigarette sections is tallied in step S8.

All of the data collected in the preceding step can be displayed in various formats in step S9. For instance, an image of the cigarette captured by the video camera 14 can be displayed on the monitor 306. Cigarette components having proper dimensions can be indicated by superimposing a line segment over the image of the corresponding cigarette section using a first color (e.g., green). Cigarette sections having out-of-tolerance dimensions can be indicated by superimposing a line segment over the image of the cigarette component using a second color (e.g., red). The line segment of the second color has a length corresponding to the expected length and position of the cigarette section. Thus by comparing the segment of the second color and the actual image of the cigarette section, the user can visually assess the degree to which the cigarette deviates from the expected dimensions. Furthermore, the actual numerical measurements can be displayed or plotted for a batch of cigarettes to detect trends of degradation in the cigarettes over time. These trends can reflect problems with the machines used to make the cigarettes, and therefore can be used to schedule maintenance on the machines.

Various computers can be used to perform the above described algorithm, such as those using Pentium™ microprocessors. Likewise, various types of image software programs can be used to detect the edges of the cigarettes, such as the Vision Program Manager (VPM)™ software produced by PPT Vision of Eden Prairie, Minnesota.

Figure 14:
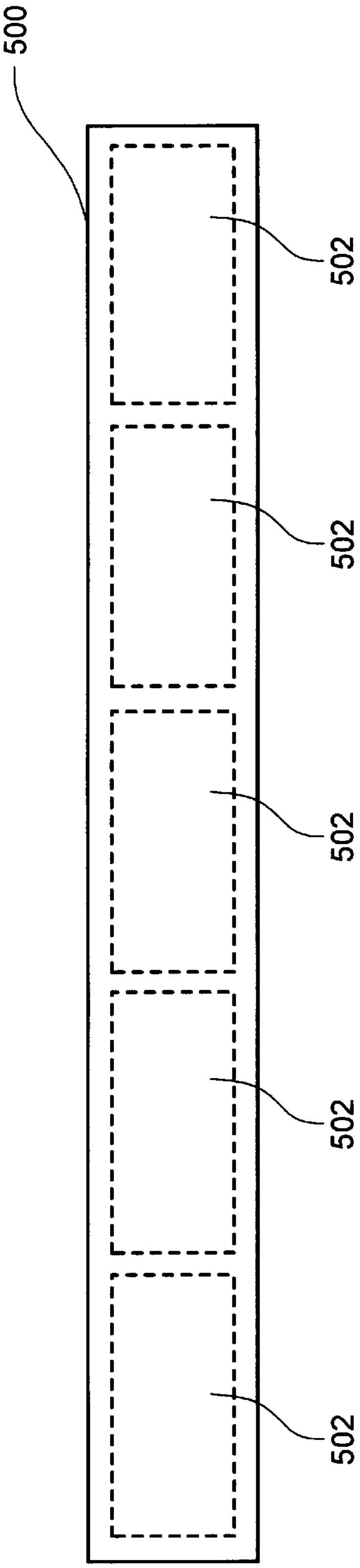
FIG. 14 shows an exemplary technique for determining the presence of a cigarette on the carriage.

FIGS. 14 through 21 illustrate various details of the above described algorithm. FIG. 14 illustrates an exemplary technique for use in determining whether a part is present on the carriage 34 in front of the camera 14. The technique comprises dividing the image 500 captured by the camera 14 into a series of adjacent pockets 502. The pixels located in each pocket 502 are then tested to determine whether they contain values above a prescribed threshold, indicating that they correspond to part of the cigarette.

Once the algorithm determines that a cigarette has indeed been captured by the video camera 14, at least one boundary separating the image of the cigarette and the background is located, which serves as a frame of reference. In this regard, see FIG. 16. As shown there, the algorithm scans the captured image along a line 537. The scanning starts at a point denoted by a small circle 534 and continues along the line 537 (henceforth referred to as an "analysis line") in the direction of the arrow. Each pixel along the path 536 is compared with a prescribed threshold. The boundary between the cigarette image and the background corresponds to the location along the line 537 where the pixel value exceeds a prescribed threshold. This threshold can correspond to an absolute threshold. Preferably, though, this threshold corresponds to a relative threshold—or in other words, a prescribed gray level above whatever gray level is measured at the starting point 534. This technique would accommodate changes in lighting environments, or differences in the kind of cigarette measured by the system.

Figure 16:
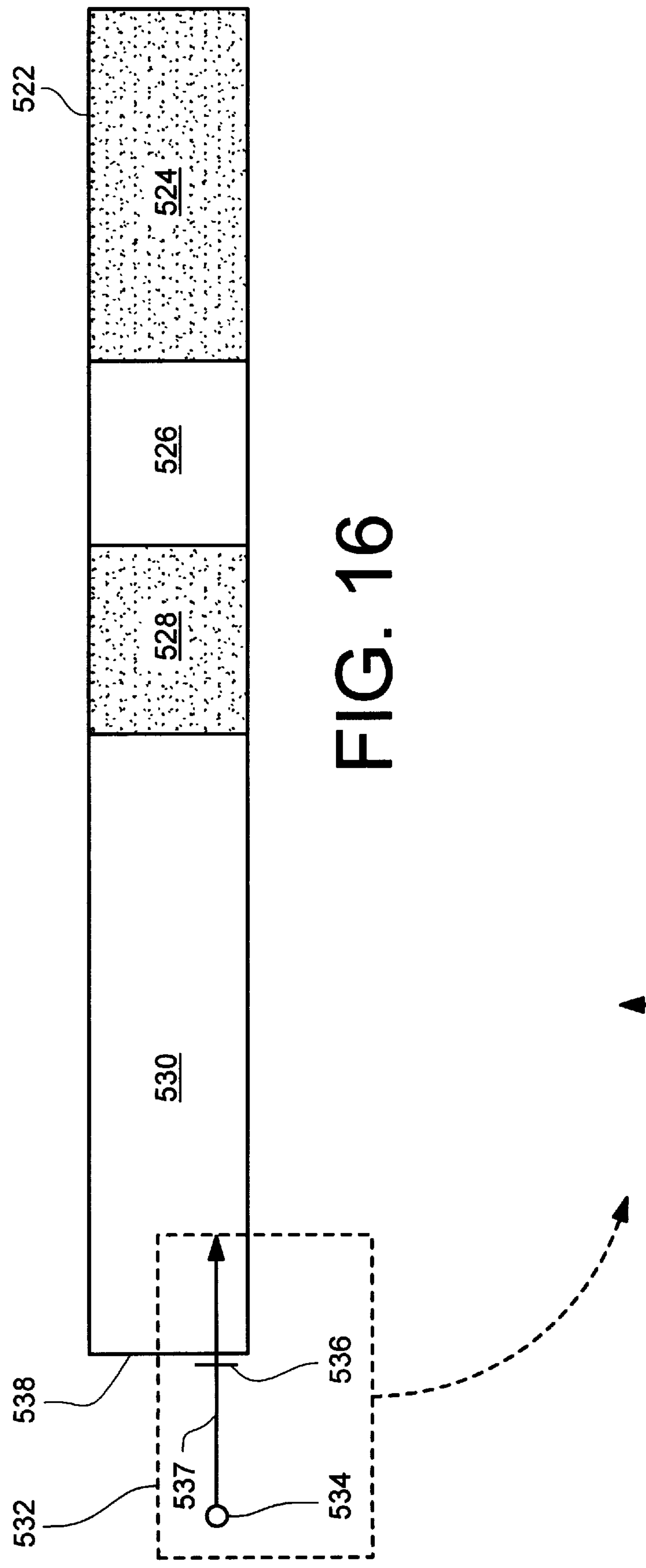
FIG. 16 shows an exemplary technique for determining a reference origin of the cigarette depicted in an image captured by the camera.
Figure 17:
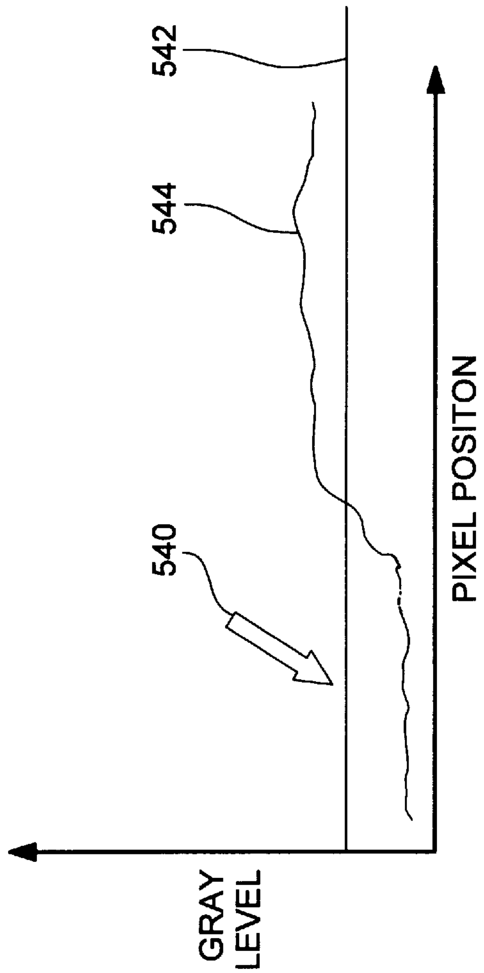
FIG. 17 shows an exemplary plot of gray level verses pixel position, for use in conjunction with the technique shown in FIG. 16.

In the specific image 522 shown in FIG. 16, the starting point 536 is selected at a prescribed location in the image to the left of the filter portion 530. The pixel values along the line 537 in region 532 can be displayed as a function of pixel position in FIG. 17. The horizontal line 542 shown there corresponds to the prescribed threshold set by the user. Thus, the algorithm records the presence of a cigarette boundary when the pixel value 544 exceeds the threshold 542. This boundary can be superimposed on the original image 522 of FIG. 16, by displaying a short line segment 536 at a location which corresponds to the location in FIG. 17 where the curve 544 crosses the threshold 542. The user can move the threshold 542 if the user visually observes that the threshold is too low or too high. For instance, as shown in FIGS. 16 and 17, the user might move the threshold up to delay the recognition of the boundary 536 (in FIG. 16). This would move the boundary 536 slightly toward the right. The threshold 542 can be moved by graphically "dragging" the threshold to a higher level using the mouse 402, as is well understood in the art.

To complete the discussion of FIG. 16, section 530 corresponds to the filter part 10, section 528 corresponds the hollow acetate tube 8, section 526 corresponds to the void, and section 524 corresponds to the tobacco plug 4 (all illustrated in FIGS. 1*a* and 1*b*).

Figure 15:
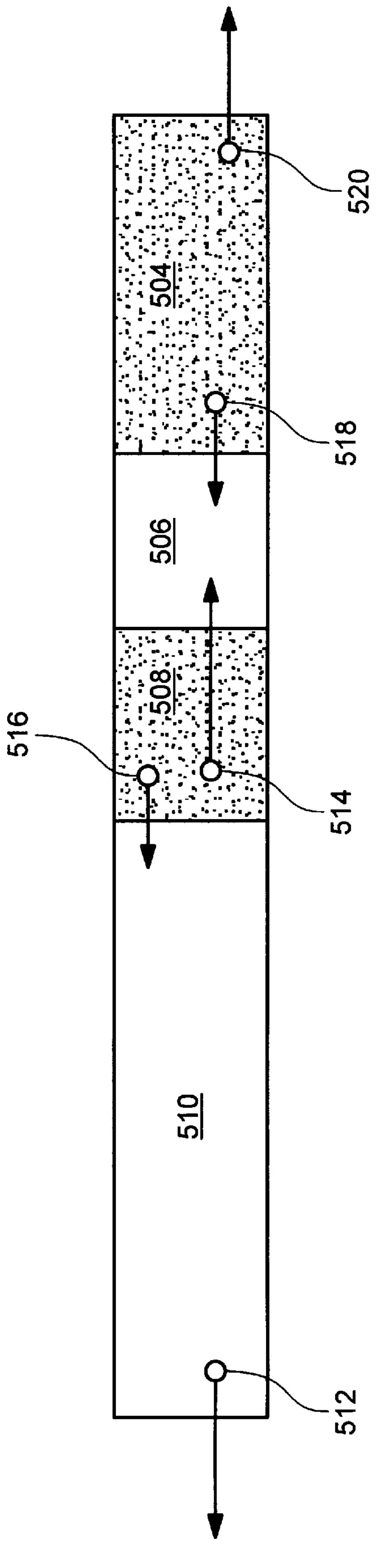
FIG. 15 shows an exemplary technique for determining various edges within the image of the cigarette formed by the video camera.

Having established a frame of reference, the edges of the cigarette sections can be detected with reference to the technique illustrated in FIG. 15. As shown there, section 510 corresponds to the filter part 10, section 508 corresponds the hollow acetate tube 8, section 506 corresponds to the void, and section 504 corresponds to the tobacco plug 4. The algorithm determines the boundaries between sections by repeating the same analysis discussed above with reference to FIGS. 16 and 17, for each boundary.

More specifically, the boundary between the filter 510 and the background of the image is determined by selecting a starting point 512 within the filter section and successively investigating pixels extending away from the point 512 (toward the left portion of the image). The first pixel to drop below a predetermined relative threshold marks the location of the boundary between the filter 510 and the background. Similarly, the boundary between hollow acetate tube 508 and the filter 510 section is determined by selecting a starting point 516 within the hollow acetate tube section 508 and then investigating pixels along a line which extends outward from the point 516 to the left. Again, the pixel value which drops below a prescribed relative threshold marks the boundary between the hollow acetate tube section 508 and the filter 510.

The remaining boundaries between the other sections of the cigarette can be determined in a manner similar to that discussed above, with reference to starting points 514, 518 and 520, which respectively, allow for the determination of the boundary between the hollow acetate tube section 508 and the void section 506, the boundary between the void section 506 and the tobacco plug section 504, and the boundary between the tobacco plug section 504 and the background image.

The user can choose the starting points which best discriminate between cigarette sections. As shown in the specific embodiment of FIG. 15, superior results are achieved by choosing analysis lines which extend from relatively dark contrast sections to lighter contrast sections. Furthermore, each analysis line shown in FIG. 15 can use a different user-selected threshold. For example, the boundary between the tobacco plug section 504 and the void section 506 may be more ambiguous than the boundary between the hollow acetate tube section 508 and the filter section 510. Accordingly, different relative thresholds may be appropriate.

The edge detection algorithm discussed above selects a boundary corresponding to the first pixel along the analysis line which exceeds (or drops below) a prescribed threshold (relative or absolute). However, it will be evident to those skilled in the art that more complex edge detection can be employed. For instance, the algorithm could sample the boundary along a plurality of analysis lines, and average the results to determine the boundary between sections. Furthermore, the algorithm could employ a non-linear analysis line.

Having determined the boundaries between the different sections, the algorithm determines the length of the sections. For instance, the length of the void section may be determined by simply subtracting the pixel position corresponding to the boundary between the tobacco plug section and the void section from the boundary between the void section and the hollow acetate tube section. This length measurement will indicate a number of pixels within the void section. This measurement is converted into proper scientific units by using a scale factor.

Figure 18:
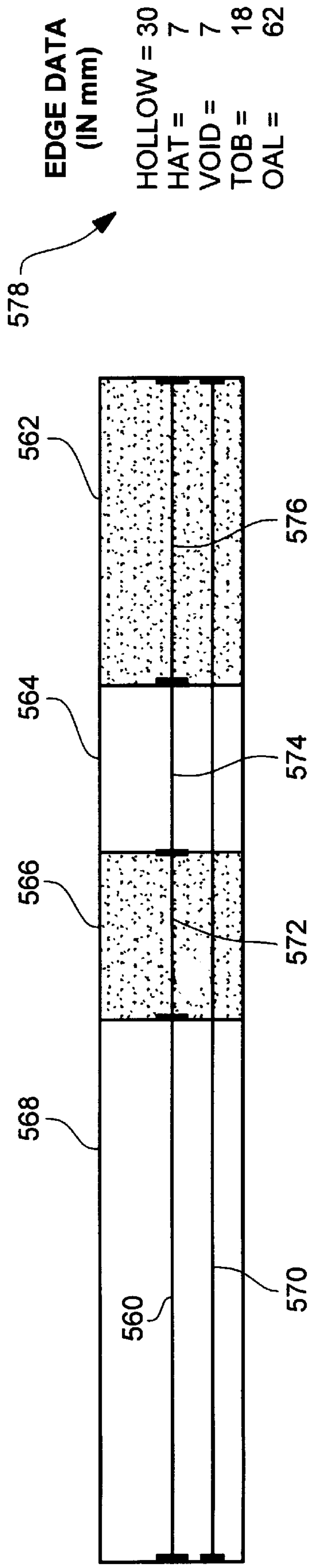
FIG. 18 shows an exemplary display of an image of a cigarette which conforms to expected standards.

After computing the lengths corresponding to M1 through M5 (with reference to FIG. 1*a*), these values are then displayed, along with an image of the cigarette from which these measurements were taken. FIG. 18 indicates one such display presentation, corresponding to a cigarette having sections lengths within tolerance. The "Hollow" (denoting the filter section 568) is measured at 30 mm, the "HAT" (denoting the hollow acetate tube section 566) is measured at 7 mm, the "VOID" (corresponding to void section 564) is measured at 7 mm, and the "TOB" (denoting the tobacco plug section 562) is measured at 18 mm. The "OAL" (denoting the overall length of the cigarette) is measured at 62 mm. This information is displayed in table 578.

The same information can be graphically presented using a series of line segments 570, 560, 572, 574 and 576 which are superimposed on the image of the cigarette. The segments can be displayed in first color (such as green) to indicate that they correspond to sections having within tolerance lengths.

Figure 19:
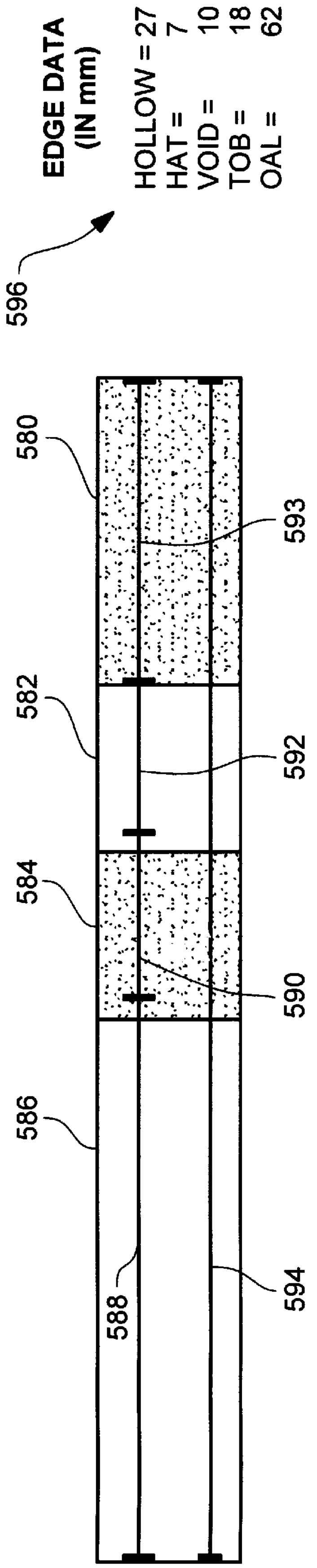
FIG. 19 shows an exemplary display of an image of a cigarette which does not conform to expected standards.

FIG. 19 shows a cigarette image having out-of-specification positioning of cigarette sections. As shown in the numerical table 596, the Hollow is measured at 27 mm, the HAT is measure at 7 mm, the VOID is measured at 10 mm, the TOB is measured by 18 mm, and the OAL is measured at 62 mm. These measurements correspond, respectively, to the length of filter section 586, the length of the hollow acetate tube section 584, the length of the void section 582, and the length of the tobacco insert section 580. In this case, the length of the filter section 586 (e.g., 27 mm) is below standard filter length (e.g., 30 mm), and the length of the void section 582 (e.g., 10 mm) is above standard void length (e.g., 7 mm). Accordingly, the line segments corresponding to these sections (line segments 588 and 592) are shown in a second color (e.g., red) to indicate the out-of-tolerance measurements. The line segments 588 and 592 reflect the standard lengths of these segments. Thus, by viewing the display of FIG. 19, the user can be quickly apprised of the degree to which the cigarette deviates from standard values. The other line segments (e.g., 594, 593 and 590) are displayed using the first color (e.g., green) to indicate that they are within tolerance. Alternatively, line segment 590 can be displayed in red because the section 584 is out of position.

Figure 20:
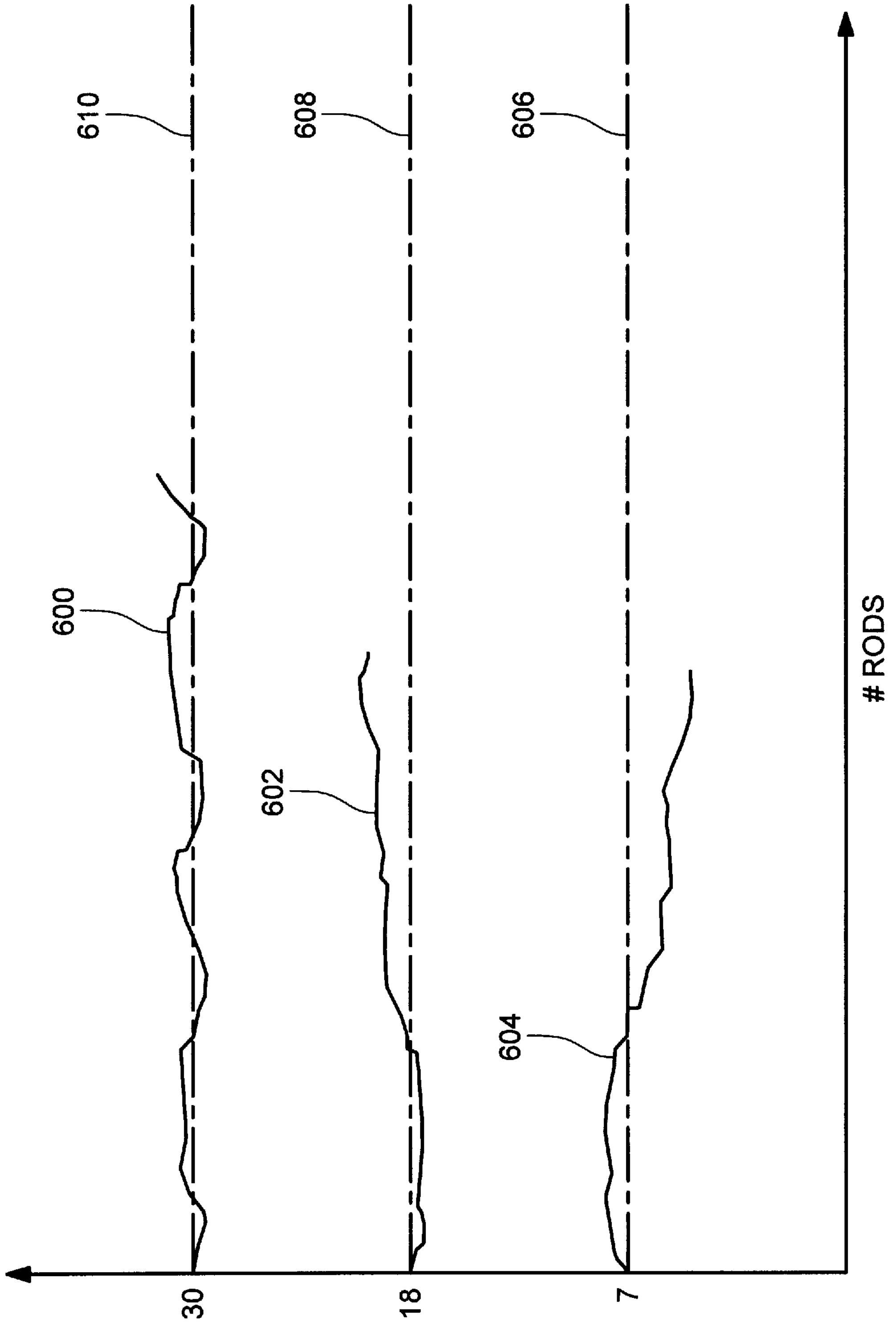
FIG. 20 shows an exemplary display of various cigarette section measurements for a plurality of cigarettes.

FIGS. 18 and 19 thus provide useful information regarding the features of individual cigarettes imaged by the camera 14. Another graph, shown in FIG. 20, plots the above described measurements with respect to a plurality of cigarettes. That is, the horizontal axis represents the number of measured cigarettes. The vertical axis includes three benchmark values; 7 mm, 18 mm and 30 mm. The 7 mm benchmark can be used as a baseline 606 on which to display the measured lengths for the void section, or the hollow acetate tube section, or both void section and hollow acetate tube section. The 18 mm benchmark is used as a baseline 608 to display the measured lengths of the tobacco plug section, and the 30 mm benchmark is used as a baseline 610 to display the measured lengths of the filter sections. Essentially, these benchmarks 610, 608 and 606 form separate graphs; they are presented together on one chart to facilitate analysis.

The data charted in FIG. 20 indicates that the filter sections changed little over the batch of cigarettes, as reflected by the relatively horizontal collection of measurements in trace 600. However, FIG. 20 indicates that, over time, the tobacco sections became increasingly longer than the standard value of 18 mm, which is reflected by the trace 602. The void section, in contrast, became increasingly shorter than the standard value of 7 mm, as reflected by the trace 604. (Although not shown, the baseline 606 can also be used to display the trend in hollow acetate tube measurements.) Upon viewing this display, a technician would be alerted to the trend, and take appropriate remedial action in the manufacturing process.

Figure 21:
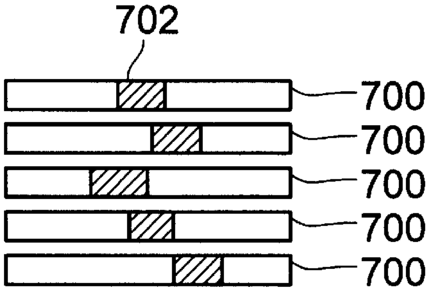
FIG. 21 shows an exemplary technique for calibrating the analysis performed by the present invention with the actual cigarette section length measurements (as separately ascertained by, for example, dissecting the cigarette).

Finally, FIG. 21 illustrates a technique whereby the user can calibrate the measurements made by the automated technique of the present invention with other measuring techniques. For example, a collection of cigarettes are scanned by the camera 14 using the parts handling system 1 discussed above, to derive a series of length measurements 708 in pixel units, and a series of corresponding measurements 706 in millimeter units. Thereafter, the cigarettes can be cut open, and the "actual" section lengths measured, to derived the measurements 704. The sliders 702 on the graphic slider bars 700 are then adjusted such that the automated measurements agree with the "actual" measurements. The resultant calibration factors associated with the position of the sliders 702 in their respective slider bars 700 are stored and used in subsequent analysis of cigarette images.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A system for inspecting cigarettes, comprising:

a radiation source for directing a beam of electromagnetic radiation through a cigarette;

a video camera for receiving said electromagnetic radiation after said radiation passes through said cigarette, and for generating an image therefrom;

processing logic for analyzing said image, said processing logic including edge detection logic for detecting edges corresponding to boundaries between different sections of said cigarette, within said image; and calculation logic for calculating respective lengths of said sections of said cigarette based on said detected edges.

2. The system of claim 1, wherein said radiation source comprises an infrared radiation source.

3. The system of claim 2, wherein output of said infrared radiation source is pulsed.

4. The system of claim 1, further comprising a parts handling system for transporting said cigarette to a position between said radiation source and said video camera.

5. The system of claim 4, wherein said parts handling system further comprises a carriage for transporting said cigarette to said position between said radiation source and said video camera.

6. The system of claim 5, further including a rail, wherein said carriage is slidably mounted to said rail.

7. The system of claim 6, further comprising an infeed bin for storing one or more cigarettes, wherein said infeed bin includes a delivery slot through which said infeed bin delivers a cigarette to said carriage when said carriage is positioned under said infeed bin.

8. The system of claim 7, further including an inhibitor bracket for blocking said delivery slot when said carriage is not positioned beneath said infeed bin.

9. The system of claim 6, further including an output bin for receiving said cigarette after said electromagnetic radiation has passed through said cigarette.

10. The system of claim 9, further including a deflector blade attached to said rail, for deflecting said cigarette into said output bin when said carriage passes beneath said output bin.

11. The system of claim 9, wherein said output bin has two compartments for receiving out-of-specification and within-specification cigarettes, and further including a deflection paddle for selectively directing a cigarette into one of said two compartments depending on whether said cigarette is out-of-specification or within-specification.

12. The system of claim 11, wherein said output bin includes a rotary air cylinder for moving said deflection paddle.

13. The system of claim 1, wherein said radiation source comprises at least one array of infrared emitting elements and output of said array is pulsed.

14. The system of claim 13, further comprising a circuit exciting said array with pulsed power in a range of about 80 to 100 amps.

15. The system of claim 13, further comprising a circuit exciting said array with pulsed power for about 500 $\mu$seconds.

16. The system of claim 1, further comprising comparing logic for comparing said calculated lengths with prestored lengths representing non-faulty section lengths, and for outputing a comparison result.

17. The system of claim 16, wherein said comparison result is graphically depicted by displaying said image of said cigarette, and superimposing indicia onto said displayed image of said cigarette indicative of said comparison result.

18. A system for inspecting cigarettes, comprising:

a radiation source for directing a beam of electromagnetic radiation through a cigarette;

a video camera for receiving said electromagnetic radiation after said radiation passes through said cigarette, and for generating an image therefrom;

processing logic for analyzing said image, said processing logic including edge detection logic for detecting edges corresponding to boundaries between different sections of said cigarette, within said image;

calculation logic for calculating respective lengths of said sections of said cigarette based on said detected edges; and comparing logic for comparing said calculated lengths with prestored lengths representing within-specification section lengths, and for outputing a comparison result;

wherein said calculated lengths comprise:

a length of a filter section;

a length of a hollow acetate tube section;

a length of a void section; and a length of a tobacco plug section.

19. A method for inspecting a cigarette, comprising steps of:

feeding said cigarette to an inspection station;

at said inspection station, irradiating said cigarette with electromagnetic radiation;

at said inspection station, receiving said electromagnetic radiation at a video camera, including electromagnetic radiation which has passed through said cigarette, and forming an image therefrom;

analyzing said image in a processor, said step of analyzing comprising detecting edges, corresponding to boundaries between different sections of said cigarette, within said image; and calculating respective lengths of said sections of said cigarette based on said detected edges.

20. The method of claim 19, wherein said step of feeding comprises transporting said cigarette from an infeed bin to said inspection station on a carriage, wherein said carriage is slidably attached to a rail.

21. The method of claim 19, wherein said irradiating step comprises producing a beam of infrared radiation.

22. The method of claim 20, wherein said beam of infrared radiation is pulsed.

23. The method of claim 19, wherein said irradiating step comprises exciting an array of infrared emitting elements.

24. The method of claim 19, further comprising the step of transporting said cigarette to an output bin after said step of irradiating.

25. The method of claim 19, further comprising the step of comparing said calculated lengths with prestored lengths representing within-specification section lengths, and outputing a comparison result.

26. The method of claim 19, wherein said irradiating step comprises exciting an array of infrared emitting elements with pulsed power in a range of about 80 to 100 amps.

27. The method of claim 19, wherein said irradiating step comprises exciting an array of infrared emitting elements with pulsed power for about 500 $\mu$seconds.

28. A method for inspecting a cigarette, comprising steps of:

feeding said cigarette to an inspection station;

at said inspection station, irradiating said cigarette with electromagnetic radiation;

at said inspection station, receiving said electromagnetic radiation at a video camera, including electromagnetic radiation which has passed through said cigarette, and forming an image therefrom;

analyzing said image in a processor, said step of analyzing comprising detecting edges, corresponding to boundaries between different sections of said cigarette, within said image;

further comprising;

calculating respective lengths of said sections of said cigarette based on said detected edges;

comparing said calculated lengths with prestored lengths representing within-specification section lengths, and outputing a comparison result;

wherein said calculated lengths comprise:

a length of a filter section;

a length of a hollow acetate tube section;

a length of a void section; and a length of a tobacco plug section.

* * * * *